US009473758B1

(12) United States Patent
Long et al.

(10) Patent No.: US 9,473,758 B1
(45) Date of Patent: Oct. 18, 2016

(54) METHODS AND SYSTEMS FOR GAME VIDEO RECORDING AND VIRTUAL REALITY REPLAY

(71) Applicant: Sliver VR Technologies, Inc., Menlo Park, CA (US)

(72) Inventors: Jieyi Long, Santa Clara, CA (US); Mitchell C. Liu, Los Altos, CA (US)

(73) Assignee: Sliver VR Technologies, Inc., Cupertino, CA (US)

( * ) Notice: Subject to any disclaimer, the term of this patent is extended or adjusted under 35 U.S.C. 154(b) by 0 days.

(21) Appl. No.: 14/960,421

(22) Filed: Dec. 6, 2015

(51) Int. Cl.
*H04N 5/77* (2006.01)
*H04N 13/00* (2006.01)
*G06T 19/00* (2011.01)
*H04N 13/02* (2006.01)
*A63F 13/497* (2014.01)

(52) U.S. Cl.
CPC ......... *H04N 13/0055* (2013.01); *A63F 13/497* (2014.09); *G06T 19/006* (2013.01); *H04N 13/0029* (2013.01); *H04N 13/0066* (2013.01); *H04N 13/0242* (2013.01); *H04N 13/0275* (2013.01)

(58) Field of Classification Search
CPC ....... A63F 13/497; A63F 13/12; A63F 13/87; A63F 13/52; A63F 13/5252; A63F 13/5255; A63F 13/5258; H04N 21/234381; H04N 21/234363; G11B 2020/10592; G11B 2020/10611; G06T 19/00; G06T 19/003; G06T 19/006
USPC .............................. 386/223; 463/32, 42, 43
See application file for complete search history.

(56) References Cited

U.S. PATENT DOCUMENTS

| 4,868,682 A * | 9/1989 | Shimizu .................. H04N 5/782 348/38 |
| 5,124,862 A | 6/1992 | Sawano et al. |
| 5,130,794 A * | 7/1992 | Ritchey ..................... F41G 7/30 348/383 |

(Continued)

FOREIGN PATENT DOCUMENTS

JP     2003116133 A  *  4/2003

OTHER PUBLICATIONS

Laurier et al, "Cameras in video games: Comparing play in Counter Strike and the Doctor Who Adventures", pp. 236-277, 2014.*

(Continued)

*Primary Examiner* — David Harvey
(74) *Attorney, Agent, or Firm* — American Patent Agency PC; Daniar Hussain; Xiaomeng Shi

(57) ABSTRACT

Methods and systems for processing computer game videos for virtual reality replay are disclosed. The method, when executed by a processor, comprises first receiving a video recorded using a virtual camera array during a game play of a source computer game. Next, upscaling the received video to a higher resolution, and interpolating neighboring video frames of the upscaled video for insertion into the upscaled video at a server. Finally, generating a spherical video from the interpolated video for replay in a virtual reality environment. The virtual camera array includes multiple virtual cameras each facing a different direction, and the video is recorded at a frame rate and a resolution lower than those of the source computer game. The spherical videos are provided on a video sharing platform. The present invention solves the chicken-and-egg problem of mass adoption of virtual reality technology by easily generating VR content from existing computer games.

29 Claims, 14 Drawing Sheets

(56) References Cited

U.S. PATENT DOCUMENTS

| | | | | |
|---|---|---|---|---|
| 5,499,146 | A * | 3/1996 | Donahue | H04N 5/9205 386/223 |
| 6,337,683 | B1 * | 1/2002 | Gilbert | H04N 5/23238 345/418 |
| 6,650,329 | B1 * | 11/2003 | Koike | A63F 13/10 345/419 |
| 6,699,127 | B1 * | 3/2004 | Lobb | A63F 13/10 345/418 |
| 6,987,767 | B2 * | 1/2006 | Saito | H04N 21/235 348/512 |
| 7,015,954 | B1 | 3/2006 | Foote et al. | |
| 7,446,772 | B2 | 11/2008 | Wong et al. | |
| 8,403,761 | B2 * | 3/2013 | Kira | A63F 13/533 463/43 |
| 8,836,848 | B2 * | 9/2014 | Neutzler | H04N 5/2254 348/340 |
| 9,266,017 | B1 * | 2/2016 | Parker | A63F 13/65 |
| 2002/0154214 | A1 | 10/2002 | Scallie et al. | |
| 2004/0266529 | A1 * | 12/2004 | Chatani | A63F 13/12 463/40 |
| 2005/0075167 | A1 * | 4/2005 | Beaulieu | G07F 17/3211 463/32 |
| 2005/0219642 | A1 * | 10/2005 | Yachida | H04N 5/335 358/448 |
| 2008/0268961 | A1 * | 10/2008 | Brook | A63F 13/12 463/42 |
| 2009/0125967 | A1 * | 5/2009 | Perlman | A63F 13/497 725/133 |
| 2010/0156906 | A1 * | 6/2010 | Montgomery | G06T 15/205 345/427 |
| 2012/0014658 | A1 * | 1/2012 | Suzuki | A63F 13/10 386/201 |
| 2012/0021835 | A1 * | 1/2012 | Keller | A63F 13/352 463/42 |
| 2012/0100910 | A1 * | 4/2012 | Eichorn | A63F 13/497 463/31 |
| 2012/0105574 | A1 * | 5/2012 | Baker | G03B 35/08 348/36 |
| 2012/0229460 | A1 * | 9/2012 | Fortin | G06T 1/20 345/419 |
| 2013/0044108 | A1 * | 2/2013 | Tanaka | G06T 15/04 345/419 |
| 2013/0215281 | A1 * | 8/2013 | Hobby | G06F 3/005 348/207.1 |
| 2014/0043477 | A1 * | 2/2014 | Luczak | H04N 5/217 348/143 |
| 2014/0139746 | A1 * | 5/2014 | Pal | H04N 21/23436 348/723 |
| 2014/0192087 | A1 * | 7/2014 | Frost | G06F 3/011 345/633 |
| 2014/0232819 | A1 * | 8/2014 | Armstrong | H04N 21/21805 348/39 |
| 2014/0323213 | A1 * | 10/2014 | Wakeford | A63F 13/497 463/31 |
| 2014/0364228 | A1 * | 12/2014 | Rimon | A63F 13/12 463/32 |
| 2016/0088287 | A1 * | 3/2016 | Sadi | H04N 13/0022 348/43 |
| 2016/0119551 | A1 * | 4/2016 | Brown | G06T 3/0093 345/646 |

OTHER PUBLICATIONS

Kamcord, "Watch Mobile Games, Watch live streams from your favorite mobile games and chat with top gamers," Kamcord website, available at https://www.kamcord.com Accessed on Dec. 2, 2015.

Everyplay, "Explore Greatest Games," Everyplay website, available at https://everyplay.com/explore Accessed on Dec. 2, 2015.

Valve Developer Community, "SourceTV," SourceTV wikipedia page on the Valve Developer Community website, available at http://developer.valvesoftware.com/wiki/Source_TV Accessed on Dec. 2, 2015.

Twitchtv, "Twitch," Twitch.tv platform, available at http://www.twitch.tv Accessed on Dec. 2, 2015.

Youtube, "Virtual Reality Videos," YouTube Help page, Upload instructions and settings, available at https://support.google.com/youtube/answer/6316263?hl=en&ref_topic=2888648 Accessed on Dec. 2, 2015.

OIiVR, "VR Panorama 360 PRO Renderer," VR Panorama Renderer for Unity 5, available at https://www.assetstore.unity3d.com/en/#!/content/35102 Accessed on Dec. 2, 2015.

* cited by examiner

370

340

300

METHODS AND SYSTEMS FOR GAME VIDEO RECORDING AND VIRTUAL REALITY REPLAY

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of game video recording and replay, and pertain particularly to methods and systems for 360-degree video recording of 2D, 3D, and VR games, with video and audio post-processing to enable spherical video replay in a virtual reality environment. Embodiments of the present invention leverage the vast number of desktop and mobile games available today and effectively bridge game content with the novel realm of virtual reality.

BACKGROUND OF THE INVENTION

The statements in this section may serve as a background to help understand the invention and its application and uses, but may not constitute prior art.

Stirred by Facebook's $2 billion acquisition of Oculus, excitement for virtual reality (VR) has been growing rapidly. Many see virtual reality as the next major computing platform that will come after mobile, with uses in applications such as movies and television, architecture, and telepresence. Yet content availability is a clear hurdle for mass mainstream adoption of the futuristic technology. On the one hand, without sufficient VR content, consumers lack motivation to purchase VR headsets or VR-capable personal computing devices that are certain to cost a considerable sum; on the other hand, without a significant VR user base, content producers such as game makers are reluctant to invest significant resources into VR content production. Without compelling content or a staunch fan base, even dramatic advances in VR technology such as are happening today would not attract enough demand to match the supply of ever more VR hardware into the market.

Current trends for virtual reality content production evolve around ground-up development of virtual reality movies, news, sporting events, and video games. Within the physical world, action cameras and camera arrays are used to film live events for presentation in a virtual reality environment such as with a professional VR headset or with 360-degree video playback in slidable panorama mode on a conventional video viewing device. Within the gaming universe, developing VR games ground-up is inherently nontrivial, yet converting existing games into their VR counterparts is by no means less challenging. While influential games such as Minecraft are expected to be VR-supported before long, it would be years until most other desktop, mobile, or console games with less fanatic supporters become VR compatible.

An alternative to explicit VR game development is to record regular game play for VR replay instead. Screen recording applications and platforms such as Kamcord and EveryPlay have existed for desktop and mobile games. However, these screencast services record the device screen only, not the entire 360-degree environment. No known solution exists to convert screencast recordings into spherical media for VR replay, or to render and record in 360 degrees directly within a 3D game. On the other hand, production-ready offline rendering systems are available to render 360 stereoscopic panorama movie image sequences compatible with VR headsets. Nonetheless, such systems are generally offline tools for demo generation by game developers only, and are incapable of real-time capture during game play. More importantly, these systems are not intended for low-end platforms or user devices, as rendering and compressing stereo VR panorama images at the size of several hundred megapixels necessitate high processing power and careful memory management and optimization.

Therefore, in view of the aforementioned difficulties, there is an unsolved need to make it easy for game developers and players to capture and record existing video games in real-time, and replay, stream, or even live-play in a virtual reality environment.

It is against this background that various embodiments of the present invention were developed.

BRIEF SUMMARY OF THE INVENTION

A system is provided for rendering and recording game video during game play, for replaying, streaming, or live-playing in a virtual reality environment.

More specifically, one embodiment of the present invention is a system for processing game videos for virtual reality replay, the system including a server having access to at least one processor, and a non-transitory physical medium for storing program code and accessible by the server. The program code, when executed by the processor, causes the processor to perform the step of receiving a video recorded using a virtual camera array during a game play of a source computer game, where the virtual camera array includes multiple virtual cameras each facing a different direction, and where the video is recorded at a frame rate and a resolution lower than those of the source computer game. The program further causes the processor to perform the steps of upscaling the received video to a higher resolution, interpolating neighboring video frames of the upscaled video to generate interpolated frames for insertion into the upscaled video, and generating a spherical video from the interpolated video for later replay in a virtual reality environment.

In some embodiments of the present invention, the generated spherical video is monoscopic. In some embodiments, the computer game is a 2D game, a 3D game, or a virtual reality game. In some embodiments, the video is received from a game connector, which converts an input data file into the received video.

In some embodiments of the present invention, the program code further causes the processor to, for each virtual camera, receive a pair of high-resolution and low-resolution screenshots of a scene during the game play, where the upscaling of the received video is based on a comparison of the high-resolution and low-resolution screenshots.

In some embodiments, the virtual camera array includes three pairs of virtual cameras in a cubic arrangement, where each pair faces complementary directions, and where each pair faces directions orthogonal from the other two pairs.

In some embodiments, the program code further causes the processor to stabilize the interpolated video, and the spherical video is correspondingly generated from the stabilized video. In some embodiments, the spherical video is generated from the interpolated video by equirectangular projection.

In some embodiments, the program code further causes the processor to receive player meta data including player pitch and yaw during the game play, and the generated spherical video is annotated with a player viewing direction based on the received player meta data.

In yet some embodiments, the program code further causes the hardware processor to generate another spherical video based on the interpolated video, where the second spherical video is used to provide a stereoscopic view.

In another aspect, the present invention is a non-transitory, computer-readable storage medium storing executable instructions, which when executed by a hardware processor, cause the processor to process computer game videos for virtual reality replay, the instructions causing the processor to perform the aforementioned steps.

In another aspect, the present invention is a non-transitory computer-readable storage medium for recording computer game videos for virtual reality replay, comprising program code stored thereon, that when executed on a processor, causes the processor to receive a request to record a game play of a source computer game for virtual reality replay, and in response to receiving the request, record a video using a virtual camera array in real-time during the game play, where the virtual camera array includes multiple virtual cameras each facing a different direction, and where the video is recorded at a frame rate and a resolution lower than those of the source game.

In yet another aspect, the present invention is a non-transitory computer-readable storage medium for recording computer game videos for virtual reality replay, comprising program code stored thereon, that when executed on a processor, causes the processor to receive an input data file generated by a computer game, initiate a game play of the computer play, where the game play is configured according to the input data file, and record a video of the game play using a virtual camera array which includes multiple virtual cameras each facing a different direction.

In some embodiments of the present invention, the video thus recorded is monoscopic. In some embodiments, the source computer game is a 2D game, a 3D game, or a virtual reality game. In some embodiments, the program code further causes the processor to, for each virtual camera, record a pair of high-resolution and low-resolution screenshots of a scene during the game play. In some embodiments, the virtual camera array is stable.

In some embodiments, the program code further causes the processor to record player meta data including player direction and yaw during the recorded game play. In yet some other embodiments, the program code further causes the processor to record another video using another virtual camera array during the game play, where each virtual camera within the second virtual camera array also faces a different direction, where the second video is recorded at a frame rate and a resolution lower than those of the source game, and where the second video is used to provide a stereoscopic view.

Yet other aspects of the present invention include the methods, processes, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which.

DETAILED DESCRIPTION OF THE INVENTION

Definitions

Figure 1:
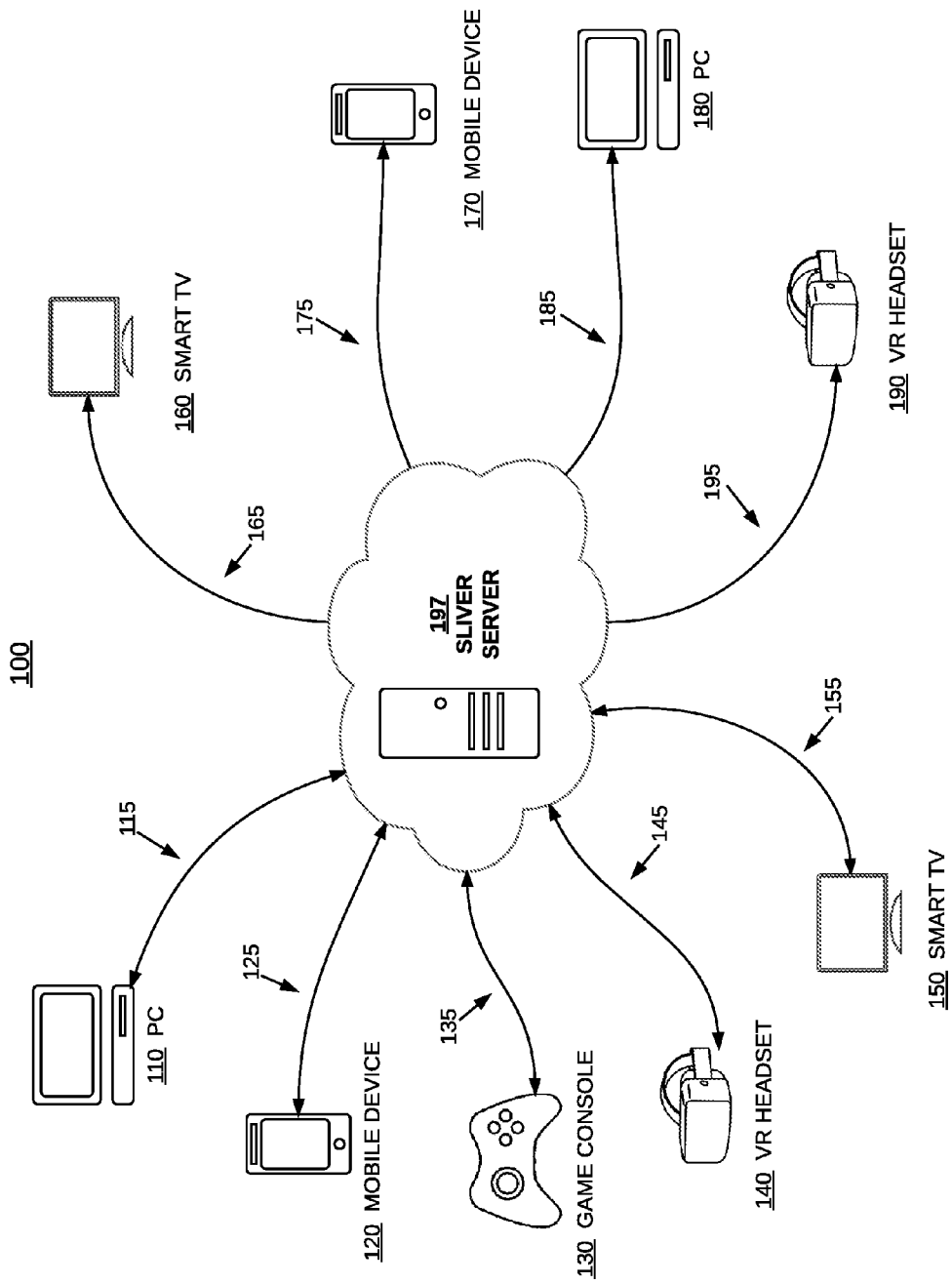
FIG. 1 is a network configuration diagram in which the present invention may be practiced, according to one embodiment of the present invention.

Some illustrative definitions are provided to assist in understanding the present invention, but these definitions are not to be read as restricting the scope of the present invention. The terms may be used in the form of nouns, verbs, or adjectives, within the scope of the definition.

"Spherical video," "360 video," "360-degree spherical video," "3D-360 video," or "VR video" is a video with a 360-degree horizontal viewing angle, and possibly a 180-degree vertical viewing angle. In other words, a spherical video is an immersive video where the view in every direction is available at the same time. A spherical video may be viewed in full VR mode with a VR headset, or in slidable panorama-360 mode on a conventional 2D or 3D viewing device. Playback of spherical videos in a VR environment is interactive, with the viewer having control over the viewing directions.

"Spherical media" are any visual media with a 360-degree horizontal viewing angle, and may include panoramic images, screenshots, slideshows, and spherical videos.

"Monoscopic" videos contain visual images that do not provide the perception of depth to the viewer. Monoscopic videos are generally captured from the perspective of a single eye.

"Stereoscopic" videos contain offset visual images to provide the illusion of depth perception when shown on a stereoscopic display. Stereoscopic videos are generally captured separately for both left and right eyes. Stereoscopic display devices may present side-by-side images or use autostereoscopy methods or the like to create depth perceptions.

"Panorama-360 mode" or "Slidable panorama-360 mode" is a display mode where spherical media are shown in panoramic form, possibly on a conventional 2D or 3D viewing device. Interactive user control such as cursor movements or screen swipes may be enabled to direct the viewing angle horizontally or vertically.

"Full VR mode" or "3D-360 mode" is a display mode where spherical media are shown in a fully immersive VR environment, possibly through a head-mounted device such as a VR headset. Interactive user control of the viewing angle is facilitated through head and body movements, and 3D audio is often provided concurrently.

"Virtual camera array" is a set of virtual cameras configured in a video game to capture the virtual world in a wide viewing angle, possibly in 360 degrees horizontally and 180 degrees vertically.

"Software Development Kit (SDK)" is a set of software development tools or programming packages for creating applications for a specific platform. An SDK may be compiled as part of the developed application to provide dedicated interfaces and functionalities. Alternatively, an SDK may be an individually compiled module, incorporable into an existing game as a plug-in, add-on, or extension in order to add specific features to the game without accessing its source code.

"Game connector" capture client or "adaptor module" is an embedded or standalone conversion tool that transforms input visual or non-visual game recordings such as CounterStrike demo files into raw video recordings that may be further post-processed to generate spherical media for replay in a virtual reality environment.

"Single frame infinite perspective" is a curvilinear perspective that describes the immersive view captured across and beyond 360 degrees. An exemplary single frame infinite perspective image is a 360-degree panorama of a scene. Another exemplary single frame infinite perspective media is a stereoscopic video played through a VR headset, where the viewer can rotate his or her head in real-time to see what is happening in the surrounding environment in any viewing direction.

"Non-transitory storage medium," "physical medium," "storage medium," and the like refer to an article of manufacture in which computer program code may be stored, said program code later to be executed by a computing device having access to at least one hardware processor, such as a server, a cloud repository, an end-user device, and so on.

"Data repository" and the like refers to a central place, such as a database, where data is stored and maintained. It is also a logical (and sometimes physical) partitioning of data where multiple databases which apply to specific applications or sets of applications reside.

"Interface," "user interface," "graphical user interface (GUI)," and the like is a user interface (UI) in a display of a computer screen, where a user of a computer system can provide input.

"Server" is a computer comprising a processor and a memory that is used by the system to provide the software program code implementing the invention to multiple client devices over a communications network.

"User-device", "end-user device", "mobile device," and the like refer to a computer with a display, input options, a processor and a memory, often in the form of a laptop, desktop, tablet, smartphone, or the like, that is used by users of the system to access the services of the present invention.

"Client-server connection", "communications link", and the like is a connection between a sever and a user-device via a communications network.

"Algorithm" is a set of instructions to be followed in calculations or processing, especially by a computing device. In a computer implemented method or system, the term algorithm may be used interchangeably with the terms "rules" or "instructions," to refer to a sequence of steps to be carried out by a computer processor following instructions encoded in memory. An algorithm can be encoded in program code stored on a physical storage medium.

"One embodiment" or "an embodiment" means that a particular feature, structure, or characteristic described in connection with the embodiment is included in at least one embodiment of the invention. The appearance of the phrase "in one embodiment" in various places in the specification is not necessarily all referring to the same embodiment, nor is a separate or alternative embodiment mutually exclusive of other embodiments. Various features are described which may be exhibited by some embodiments and not others.

Overview

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

Broadly, embodiments of the present invention relate to methods and systems for the recording of existing mobile, desktop, or console games during game play, and for post-processing and replaying such game recordings in a virtual reality environment. Unlike conventional screencasts where a viewer only passively sees the player's field of view, the present invention allows the viewer to immerse and see what is happening around the player's position at any viewing direction, possibly in real-time. Thus, embodiments of the present invention allow players and viewers to review the effectiveness of maneuver techniques and gaming strategies, to train and improve upon past gaming experiences, and to experience or re-experience landscape or player details from new perspectives.

One advantage of the present invention is to provide high-quality immersive VR playbacks while minimizing performance impacts on a source game from which a game play is captured, possibly in real-time. Even though game scenes often contain textures that are highly repetitive, high-definition image rendering is implicitly resource intensive. Thus, it is counterintuitive to render or generate full scenes outside the player's limited field of view, especially on resource-limited devices such as smartphones. Embodiments of the present invention tackle this issue by rendering and recording game scenes both inside and outside the player's limited field of view at lower frame rates and/or lower resolutions, and subsequently shifting the processing workload to a backend server instead. Although the low-quality captures are not shown to the player directly, they are post-processed to generate high-quality spherical media that may be viewed in a VR environment.

Specifically, embodiments of the present invention relate to a game video recording and processing platform comprising a capture client, a post-processing server backend, and a VR view client residing on a dedicated or a general purpose user-device.

A capture client may be SDK-based, or be a game connector or adaptor module. An SDK-based capture client may be integrated into existing 2D or 3D mobile, desktop, and console games during the game development stage; alternatively, an SDK-based capture client may be an individually compiled module, incorporable into an existing game as a plug-in, add-on, or extension in order to add specific features to the game without accessing its source code. The capture client utilizes one or more virtual cameras constituting one or more configurable virtual camera arrays capable of recording a game from various directions during real-time game play. Video thus recorded are either monoscopic or stereoscopic, with possible view synthesis through the post-processing server. One feature of an SDK-based capture client developed according an embodiment of the present invention is its ability to record from multiple directions in real-time without significantly compromising the frame rate of the source game. Capture performance is optimized by recording at low resolution and low frame rate, while moving as much video post-processing to the server backend as possible. In addition, the SDK-based capture client is responsible for collecting training data for later use by the post-processing server backend, again without noticeable impact on the frame rate of the source game.

By comparison, a game connector capture client is an embedded or standalone conversion tool that transforms input visual or non-visual game recordings such as CounterStrike demo files into video recordings that resemble those created by an SDK-based capture client. In other words, a game connector capture client mimics the functionalities of an SDK-based capture client in the sense that both output the same type of raw recording data and game meta data, but a game connector capture client generates such output data off-line, by recording a game play configured according to external data files provided by an existing game or gaming platform, while an SDK-based capture client directly records within a game play in real-time.

The post-processing server backend includes a video post-processing engine, an audio post-processing engine, and other components providing general video hosting services such as storage, on-demand replay, streaming, video searches, and user management. Within the video post-processing engine, raw data uploaded from the capture client are upscaled and interpolated before being warped into output spherical media such as screenshots, slideshows, and spherical VR videos. Both resolution recovery and frame interpolation rely on a machine learning system, which analyzes and learns from training data collected by the capture client to establish and update deep learning models that progressively improve the quality of the output spherical media. For example, a feed-forward convolutional neural network may be utilized in some embodiments of the present invention to continuously and iteratively update the output spherical media quality as more training data are collected. Video quality re-optimization may also be performed as more training data become available. Moreover, processing overheads associated with video capture by the capture client may be amortized over time, with capture resolution further reduced without sacrificing the quality of the final output media. Within the audio processing engine, raw input data are analyzed to identify, tag, and locate sound sources, thus enabling real-time spatial sound transformation by the VR view client during virtual replay of the post-processed game recording.

Some embodiments of the present invention provide video sharing platform functionality, comprising a VR view client or viewer application for game players and viewers to upload and browse VR content generated by the post-processing server backend, where such VR content are generated from game video recordings provided by the capture client. VR content may be viewed live or on demand. The VR view client supports both monoscopic and stereoscopic spherical media, where monoscopic spherical media may be replayed in either slidable panorama-360 or full VR modes, depending on whether a VR headset is in use. In addition, the VR view client is capable of utilizing both video and audio meta data to further enhance the immersive experience of VR replay. For example, the view client may annotate the player viewing direction, or perform sound transformations in real-time in response to the viewing user's head or body movements during VR replay, yet without affecting any audio annotations by the original player of the game recording.

Embodiments of the present invention allow gamers to readily generate VR content from existing 2D, 3D, and VR mobile, desktop, or console games, thus leveraging the vast number of games currently available and their sheer user base to produce a significant amount of relevant VR content in a relatively short amount of time. In addition to providing a fully immersive environment for viewers to experience the game play from additional and new perspectives, the resulting spherical media are also of tremendous value to gamers who could in turn determine weaknesses in their gaming strategies by observing their full surroundings during the game replay. From a more technical perspective, as discussed previously, one advantage of the present invention is to remove processing and memory management bottlenecks for live-rendering of monoscopic or stereoscopic panorama video sequences, thus fully or partially removing the need for expensive and sophisticated graphics processing hardware, and indirectly reducing the barrier of entry into the realm of virtual reality by both game developers and players.

SLIVER is a trademark name carrying embodiments of the present invention, and hence, the aforementioned trademark name may be interchangeably used in the specification and drawing to refer to the products/services offered by embodiments of the present invention. The term SLIVER may be used in this specification to describe the overall game recording, and virtual reality replaying and streaming platform, as well as the company providing said platform. With reference to the figures, embodiments of the present invention are now described in detail.

System Architecture

FIG. 1 shows a schematic diagram of a network configuration 100 for practicing one embodiment of the present invention. One or more user devices compatible with both a SLIVER capture client and a SLIVER VR view client may be connected to a SLIVER server 197 through different types of network communication links. Such user devices may be operated by game players who record and commentate game playthroughs for VR broadcasting over the SLIVER platform, or general users with access to game recording data files. In various embodiments, such user devices may be a personal computer 110, a mobile device 120, a game console 130, a VR headset 140, a smart TV 150, or the like. Mobile device 120 may be a laptop computer, a tablet, a smartphone, or wearable devices such as a watch or smart glasses. Game console 130 may be a dedicated gaming device such as a home video game console or a handheld game console. VR headset 140 is a head-mounted device capable of recording user head and body movements during game play. For example, it may be a dedicated high-end device such as Oculus Rift or Sony PlayStation VR; it may alternatively be a low-end device such as Google Cardboard or Samsung Gear VR, to be used concurrently with a smartphone. Smart TV 150 may be a television set or set-top box with integrated processing and networking capabilities, where software applications are pre-loaded into the device. Some exemplary set-top boxes currently available today include AppleTV, Hulu Box, and Mibox. Each of user devices 110, 120, 130, 140 and 150 may perform game video recording through a SLIVER SDK-based capture client, with data uploaded to SLIVER Server 197, while also allowing VR viewing of post-processed spherical media, as downloaded from SLIVER Server 197. Communication links 115, 125, 135, and 145 may be wireless or wired, and may employ technologies and protocols comprising Ethernet technology, Local Area network (LAN), Wide Area Network (WAN), an optical network, and the like. Alternatively, each of these user devices mentioned above may contain a SLIVER game connector capture client instead, separately or concurrently with the SDK-based capture client, to convert visual or non-visual game recordings into data streams suitable for processing by SLIVER server 197.

SLIVER server 197 is a platform for post-processing game recordings received from user devices 110, 120, 130, 140, 150, or the like, where the post-processed game recording may be replayed or live-streamed in a virtual reality environment. In some embodiments, SLIVER Server 197 is a distributed system, where video post-processing, audio post-processing, and media storage and streaming services are implemented on physically or logically separate devices. In some embodiments, SLIVER Server 197 is hosted in the cloud. Monoscopic or stereoscopic spherical media thus produced by SLIVER Server 197 may be downloaded to any of the above mentioned user devices, for live viewing or on-demand replay through a SLIVER view client installed therein. While VR headset 140 provides a fully immersive VR environment, each of user devices 110, 120, 130 and 150 may allow VR viewing in slidable panorama-360 mode instead. Furthermore, in some embodiments, SLIVER server 197 is connected to one or more viewing devices with a SLIVER VR view client installed. For example, such a viewing device may be a smart TV 160, a mobile device 170, a personal computer 180, a VR headset 190, or the like. In some embodiments, smart TV 160 is connected to a set-top box such as an Apple TV or a Hulu box, which hosts the SLIVER view client instead. Again, communication links 165, 175, 185, and 195 between SLIVER server 197 and the various viewing devices may be wireless or wired, and may employ technologies and protocols comprising Ethernet technology, Local Area network (LAN), Wide Area Network (WAN), an optical network, and the like.

Figure 2:
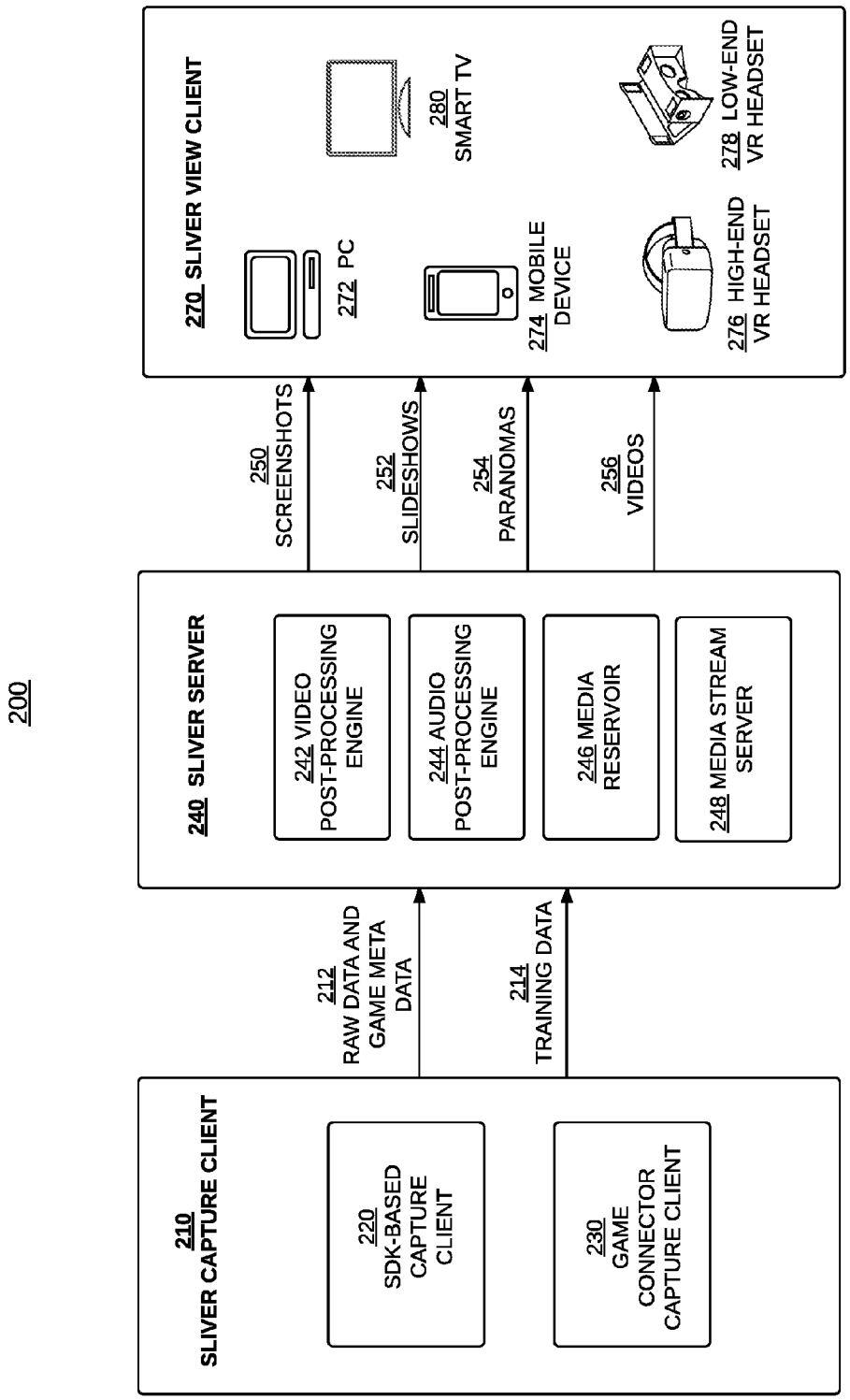
FIG. 2 is an architectural overview of a game video recording and VR replay framework, according to one embodiment of the present invention.

FIG. 2 is a schematic diagram showing an architectural overview 200 of a game video recording and VR replay framework, according to an exemplary embodiment of the present invention. In this embodiment, the SLIVER platform comprises three components: a capture client 210, a server 240, and a view client 270.

In various embodiments, capture client 210 may comprise one or both of SDK-based capture client 220, and game connector or adaptor module 230. Both types of capture clients provide raw video recording data and game meta data 212 as well as training data 214 to SLIVER server 240. While SDK-based capture client 220 records within a game play using virtual camera arrays in real-time, game connector capture client 230 converts external game recording data files into data streams suitable for processing by SLIVER server 240. More particularly, game connector capture client 230 may generate such output data streams off-line, by rendering and recording a game play configured according to external data files provided by an existing game or gaming platform.

Generally, a Software Development Kit or SDK is a set of software development tools or programming packages for creating applications for a specific platform. An SDK may be compiled as part of the developed application to provide dedicated interfaces and functionalities. For example, SDK-based capture client 220 may be integrated into game development platforms such as Unity and Unreal, for incorporation during the development stage into existing mobile games, desktop games, or dedicated VR games. Once initiated, SDK-based capture client 220 provides an application program interface (API) or user interface (UI) to a gamer for configuring and controlling one or more virtual camera arrays to record a game play from different viewing directions. Even though only scenes inside the player's limited field of view are displayed during game play, the embedding of virtual camera arrays through SDK-based capture client 220 induces additional rendering and subsequent recording of scenes outside the player's field of view, possibly at lower frame rates or lower resolutions. Exemplary virtual camera array arrangements shall be described with respect to FIGS. 3A, 3B, and 3C subsequently. Additional exemplary capture UI support services provided by SDK-based capture client 220 include audio commentary and annotation, video compression and upload, and the like. Furthermore, SDK-based capture client 220 is responsible for capturing training data 214 to assist server 240 in video post-processing. Alternatively, in some embodiments, SDK-based capture client 220 may be an individually compiled module, incorporable into an existing game as a plug-in, add-on, or extension. For example, a modification or mod file for Minecraft can be written as an SDK-based capture client: once loaded into the game, the Minecraft mod may set up and direct one or more virtual camera arrays, to render and capture the Minecraft universe in various directions. Moreover, in some embodiments, SDK-based capture client 220 may be loaded into dedicated game consoles or game compatible set-top boxes.

Similar to SDK-based capture client 220, game connector capture client or adaptor module 230 feeds raw data and game meta data 212, and training data 214 to server 240. However, as the name implies, game connector capture client 230 is a converter, adaptor, or interfacing module between an existing game or gaming platform and SLIVER server 240. It is a conversion tool for transforming input visual or non-visual game recordings such as CounterStrike demo files into video recordings that resemble those taken by a virtual camera array within a SDK-based capture client.

In some embodiments, game connector capture client 230 is an add-on, plug-in, or extension embedded in an existing game or gaming platform. For example, it may be included in CounterStrike directly or in a platform such as Steam to convert a player's stored matches or exported demo files into appropriate video recordings. A CounterStrike demo is not an encoded video file but an encrypted data file that documents information such as player actions and positions during a game play. It is usually viewed through a replay within the game itself. Game connector capture client 230 may initiate an off-line replay of a CounterStrike game, where the replay proceeds, or is configured, according to the demo file. Game connector capture client 230 may then induce the rendering of the virtual world surrounding the player's path within the game using one or more virtual camera arrays, to capture multi-directional video recordings that may be further post-processed by SLIVER server 240. Similar to SDK-based capture client 220, game connector capture client 230 has full access to the virtual camera arrays, thus such virtual camera arrays are fully configurable. Unlike SDK-based capture client 220, game-connector capture client 230 records a replayed game, after the original play has terminated, thus capture frame rate and resolution by game connector capture client 230 may be the same as or even higher than those of the source game.

In another example, game connector capture client 230 may analyze a screencast recording where only a player's front facing direction is available, to generate additional video captures in other directions accordingly. The front facing virtual camera within the virtual camera array thus employed is constrained, but other virtual cameras within the virtual camera array may still be configurable. In some embodiments, game connector capture client 230 may be a standalone application for data file to raw video conversion. In short, game connector capture client 230 emulates an SDK-based capture client in generating the same type of output data for upload to SLIVER server 240.

One feature of the present invention is to minimize processing and memory overheads on SLIVER capture client 210, and to minimize performance impacts on a source game while capturing a game play in real-time. Accordingly, capture client 210 transfers all raw data and game meta data 212 directly to server 240, thus shifting the processing workload to the sever backend 240 as much as possible. SLIVER server or server backend 240 comprises at least a video post-processing engine 242, an audio post-processing engine 244, and components for general video or media hosting services such as media reservoir 246 and media stream server 248. In some embodiments, additional video hosting services such as user login and management, and video search, ranking, rating, and commenting, are also provided through server 240. In general terms, video post-processing involves image stitching of video frames as captured by individual virtual cameras within a virtual camera array to generate output spherical media that may be viewed in a VR environment. In some embodiments, capture resolution and frequency are reduced in comparison to those of the source game to save processing power and to minimize data transfer at capture client 210. For example, high definition (HD) video with a resolution of 1080p may be recorded with a 15% frame rate drop from the source game. Correspondingly, video post-processing engine 242 performs high-resolution recovery as well as frame interpolation based on training data 214 received from capture client 210 to smooth the input data, before stitching or warping video frames into spherical media for output to view client 270.

A spherical video, 360 video, 360-degree spherical video, 3D-360 video, or VR video is a video recording with a 360-degree horizontal viewing angle, and possibly a 180-degree vertical viewing angle. In other words, a spherical video is an immersive video where the view in every direction is available at the same time. Thus, a viewer may see what is happening in the surrounding environment in any desired viewing direction. Similarly, spherical media may refer to any visual media with a 360-degree horizontal viewing angle, and may include screenshots 250, slideshows 252, panoramic images or image sequences 254, and spherical videos 256. Spherical media may be monoscopic or stereoscopic. Spherical media may be viewed in full VR mode with a head-mounted device such as a VR headset, or in slidable panorama-360 mode on a conventional 2D or 3D viewing device. More particularly, panorama-360 mode or slidable panorama-360 mode is where spherical media are shown in panoramic form, possibly on a conventional 2D or 3D viewing device, with interactive user control enabled to direct the viewing angle horizontally or vertically. While, full VR mode or 3D-360 mode is where a spherical video is shown in a fully immersive VR environment through a head-mounted device such as a dedicated VR headset, with interactive user control of the viewing angle achieved through user head and body movements. In any of the above mentioned display modes, 3D audio may be provided concurrently.

View client 270 allows a user of the SLIVER system to live-stream or replay monoscopic or stereoscopic spherical media received from SLIVER server 240 on demand. In various exemplary embodiments, view client 270 replays spherical media in either slidable panorama-360 mode through a personal computer 272, a mobile device 274, a smart TV 280 or the like, or in full VR mode with a high-end VR headset 276 or a low-end VR headset 278. Exemplary high-end VR headsets include Oculus Rift and Sony PlayStation VR, while exemplary low-end VR headsets include Google Cardboard and Samsung Gear VR. Depending on the display format requested by view client 270, output spherical media delivered by SLIVER server 240 may be screenshots 250, slideshows 252, panoramas 254, or spherical videos 256. In some embodiments, spherical media output from SLIVER server 240 are accompanied by meta data useful for audio recovery and additional video post-processing by view client 270.

In some embodiments, view client 270 is a standalone application dedicated to VR replay of spherical media. For example, it may be a mobile client application installed on a smartphone, or a display module loaded into a PC or game console connected to a VR headset. In some other embodiments, view client 270 is a plug-in, add-on, or extension to an application such as a web browser or a video game emulator, a gaming platform such as PlayStation or Xbox, a content-sharing platform such as Twitch or Facebook, or any other similar software or portals that may be used to distribute and view spherical media served by SLIVER server 240. In yet some other embodiments, view client 270 is a conventional general purpose video sharing platform such as YouTube, Vimeo, Youku, and Bilibili, which may support content viewing in slidable panorama-360 mode.

The SLIVER platform as illustrated by architectural overview 200 is a self-contained system for VR replay of game video recordings. A gamer may record from non-VR 2D and 3D games, and a viewer may watch the ensuing spherical media on conventional mobile or desktop devices, or through a VR headset. Allowing the player to record spherical media from existing non-VR games addresses the challenge of the lack of VR games. Allowing for viewing spherical media in slidable panorama-360 mode is valuable given the installed base of millions of users that use YouTube, Youku, and other video sharing sites that already support these formats. Observe that the recording technology works naturally for VR games. With a VR headset, the viewer can enjoy the video in full VR mode, which is much richer and more immersive experience compared to the slidable panoramic-360 mode.

As previously discussed, replay of spherical media or spherical game video thus generated allows a user of the SLIVER platform to observe his or her full surroundings from any viewing direction. For example, with a VR headset, the user may rotate his or her head in real-time during replay to see what is happening behind his or her back or even down at his or her feet. This highly immersive feature may be considered a "single frame infinite perspective" view, thus enhancing the viewing experiences by orders of magnitude. Spherical game videos thus generated may provide tremendous value to gamers. For example, a gamer who is shot from behind by an opponent while playing a first person shooting game such as CounterStrike may replay the recorded game video and simply turn his or her head back to see how the enemy had approached during the attack. Similarly, a gamer who has been passed by an opponent at some point during a car racing game may replay the game video and observe the opponent's maneuver techniques while still catching up from behind. Additionally, many 3D game worlds like Dungeon Crawlers have tremendous amount of landscape and player detail, which are often missed during game play as the player focuses on story development or character interaction. VR videos allow users to experience and re-experience those details from new and different perspectives.

Capture Client

In various embodiments, capture client 210 may comprise one or both of SDK-based capture client 220 and game connector capture client 230. As described in detail with respect to FIG. 2, capture client 210 is responsible for basic capture UI support, game video recording, and training data collection. Generally, an SDK-based capture client 220 provides user interfaces for gamers to start or stop real-time video capture during game play, to enable, disable, or configure virtual camera arrays, and to upload captured raw data for processing by a SLIVER server. Correspondingly, a game connector capture client 230 provides basic configuration options, to set up one or more virtual camera arrays, to emulate real-time recording within a particular game replay configured according to an input data file. A virtual camera array is a set of virtual cameras configured in a video game to capture the virtual world in a wide viewing angle, possibly in 360 degrees horizontally and 180 degrees vertically.

Figure 3C:
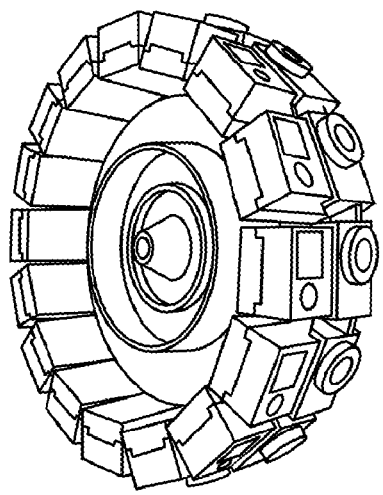
FIG. 3C is a third illustrative example of a virtual camera array arrangement for 360-degree capture, according to one embodiment of the present invention.
Figure 3B:
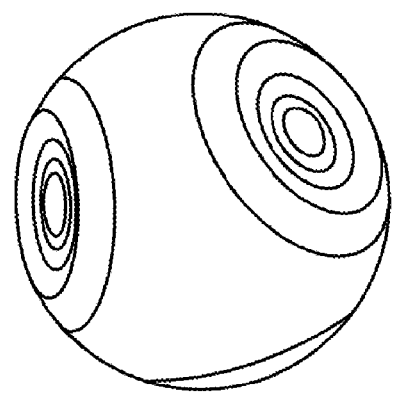
FIG. 3B is another illustrative example of a virtual camera array arrangement for 360-degree capture, according to one embodiment of the present invention.
Figure 3A:
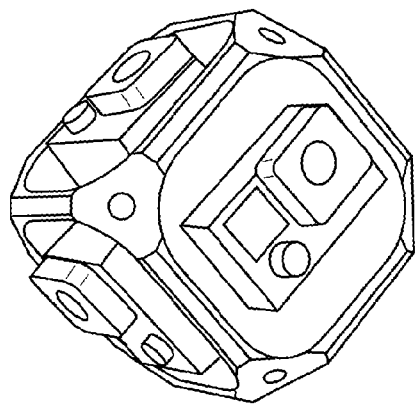
FIG. 3A is an illustrative example of a virtual camera array arrangement for 360-degree capture, according to one embodiment of the present invention.

FIGS. 3A, 3B, and 3C are diagrams of three illustrative virtual camera array arrangements for 360-degree capture, according to various embodiments of the present invention. FIG. 3A shows a cubic arrangement 300, with six virtual cameras each pointing towards complementary and orthogonal directions including front, back, left, right, top, and bottom. As each camera may have a viewing angle of 170 degrees covering the far left to the far right, taking six shots at the same time captures the full 360-degree horizontal and 180-degree vertical environment surrounding a specific reference point in the virtual world. Generally, this reference point tracks the movement of a player's character within the game world. In some embodiments, configuration options may be provided by capture client 210 to set the tracking precision. Alternatively, the reference point may be static or fixed. In some embodiments, the six resulting sub-images may be combined into a single frame of a single game video data stream. In other embodiments, image sequences from each individual virtual camera may be viewed as a separate game video data stream.

FIGS. 3B and 3C are additional exemplary arrangements in the form of a triangular pyramid 340 with four virtual cameras and a circular rig 370 with sixteen virtual cameras. Either may capture 360-degrees horizontally. While having a fewer number of virtual cameras such as in arrangement 340 may be more resource efficient, having a larger number of virtual cameras such as in arrangement 370 may reduce distortion captured by each camera. In various embodiments, a virtual camera array utilized by capture client 210 may by user configurable, and may include any number of virtual cameras arranged in any geometric shape, with each camera orientated in any desired direction. Unlike real-world camera arrays which are limited by camera form factors, virtual camera array arrangements are only limited instead by computing resources such as processing speed, throughput, or data transmission bandwidths between capture client 210 and SLIVER server 240. In some embodiments, a virtual camera array utilized by capture client 210 may cover less than 360 degrees horizontally or 180 degrees vertically. For example, configuration options may be provided for a gamer or a user to choose from one or more pre-defined virtual camera array arrangements, to disable one or more virtual cameras within a virtual camera array, to modify camera positions or orientations, or to define personalized virtual camera arrays with configurable arrangements and camera characteristics.

In some embodiments, virtual cameras within a virtual camera array are operated synchronously, with the same capture resolution and frame rate. In some other embodiments, virtual cameras within the same virtual camera array may be configured individually to operate under separate resolution and frame rate settings. For example, a front facing camera within cubic arrangement 300 may be configured to capture at a higher resolution with double the frame rate than a side-facing camera. Image sequences thus captured may be combined into a single video data stream, or multiple data streams corresponding to separate virtual cameras. Individual camera settings may be transferred to SLIVER server 240 as game meta data 212, to ensure post-processing of captured video is performed correctly. In addition, while a single array of virtual cameras is sufficient to capturing monoscopic game videos, two arrays may be needed for a stereoscopic view, depending on whether view synthesis is performed within SLIVER server 240.

For real-world VR videos, to avoid causing motion sickness to viewers, the capturing camera needs to be stable. Thus, the front shooting direction should remain unchanged throughout the entire video, with shaking, jerking, or bobbing motions of the camera stabilized or smoothed out. For game video recordings, a viewer may want to follow the player's viewing angle or head movements. Hence, in some embodiments of the present invention, the virtual world is captured with a stable camera, and meta data such as player pitch and yaw are recorded and uploaded to SLIVER server 240. Game meta data may be transferred as separate data packages, or be encoded into a game video recording directly. During replay, view client 270 may utilize such game meta data to annotate the player's viewing direction with a marker.

Additionally, as a virtual camera array tracks a player's movement, acceleration, and even head position within the game environment, camera stabilization for spherical videos may be necessary. When capture client 210 has explicit access to the virtual camera array, the movement path of the virtual camera array may be computed or interpolated explicitly to smooth out the virtual camera array's movements and rotations, thus minimizing potential dizziness when a viewer watches the replay with a VR headset. When capture client 210 does not have direct control of camera movements, image post-processing may be performed to reduce potential viewer motion sickness.

As previously discussed, one feature of the present invention is to minimize performance impacts on a source game while capturing a game play, possibly in real-time. The performance impact of 360-degree capturing on the source game is threefold. Firstly, capturing a virtual world at multiple directions requires extra rendering, possibly by a dedicated Graphics Processing Unit (GPU). Secondly, images thus captured by a virtual camera array reside in the GPU as texture data, and need to be copied back to a main memory for further processing. If not handled carefully, a texture copying process could stall both the CPU and the GPU, thus degrading the frame rate significantly. Finally, texture pixel data needs to be compressed, which may further consume considerable CPU computing power. Several strategies are employed by the SLIVER platform to minimize the performance overheads mentioned above. Firstly, the capture resolution and frequency are reduced, thus effectively reducing the overhead of extra rendering. The capture frequency can be as low as one capture every four frames, and the capturing resolution per direction may require only 360×360p even for HD video with a resolution of 1440p. Server-side post-processing may generate smooth videos with decent resolution from this captured data. Secondly, OpenGLES/EGL features, such as pixel buffer object, off-screen rendering, and the like, may be leveraged to perform non-blocking pixel data reads from the GPU to the main memory without stalling either the CPU or GPU. Finally, when available, a dedicated on-chip hardware video encoder may be utilized to compress the image data to avoid consuming CPU computing power.

Figure 4A:
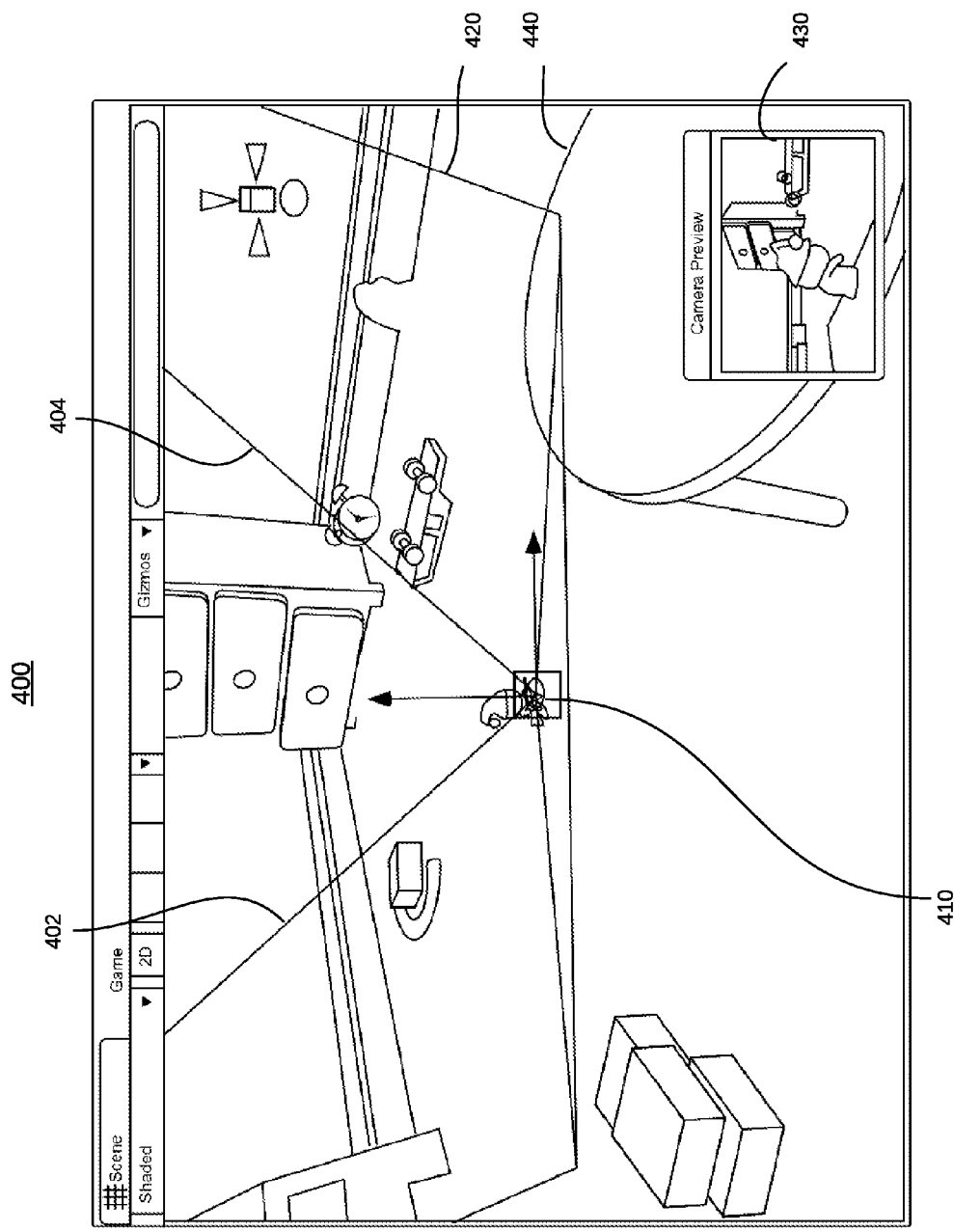
FIG. 4A is an exemplary screenshot of an interface of a single frame infinite perspective and for previewing video captured through a single camera, according to one embodiment of the present invention.

FIG. 4A is an exemplary screenshot of an interface for previewing video captured through a single virtual camera, according to one embodiment of the present invention. In this particular example, a virtual camera array tracks the motion of a player through a third person view. That is, the virtual camera array is placed at a fixed distance behind and slightly above the player's character 410. Boundaries 402 and 404 outline the player's limited 60-degree field of vision that would be seen from a first person perspective. Capturing frame 420, on the other hand, represents the field of view of a front facing camera, with camera preview window 430 showing the correspondingly captured video recording. Thus, camera preview 430 illustrates what could be recorded during real-time capture on a gaming device with a SDK-based capture client 220, or what could be shown to the user during data conversion by a game connector capture client 230. In some embodiments, more than one camera preview window may be available to show videos recorded by individual virtual cameras within a virtual camera array. The God's eye view, or single frame infinite perspective 400 of the gaming environment may be provided through a SDK-based capture client 220 during the game development stage to allow game developers to analyze and determine virtual camera configurations and settings, thus presenting a "single frame infinite perspective" of the gaming environment. In addition, such single frame infinite perspective views and/or camera preview 430 may be provided to players before or during a real-time game play through SDK-based capture client 220, or before and/or during a data conversion process by game connector capture client 230. Together with interactive user controls, such video recording previews allow further changes or adjustments to one or more deployable virtual camera arrays, thus enabling full customization of the capture experience. Freedom in customizing virtual camera array configurations may allow enthusiastic players to record from unique perspectives, while also enabling players or users with limited computing resources to set recording parameters strategically.

Figure 4B:
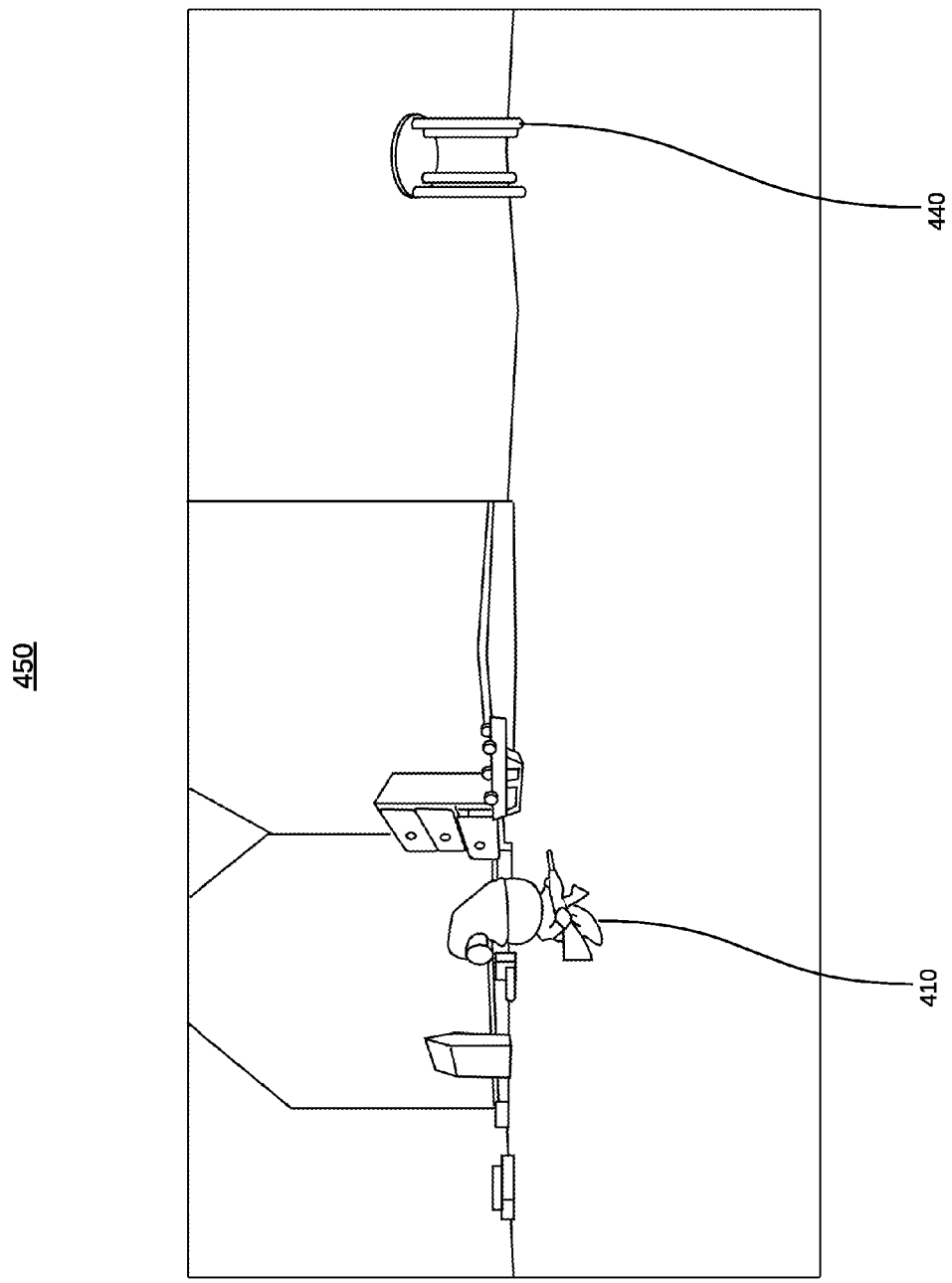
FIG. 4B is an exemplary screenshot of a VR replay of a post-processed video, according to one embodiment of the present invention.

While game video recordings may be captured by one or more virtual camera arrays through capture client 210 as shown in FIG. 4A, raw data and game metadata 212 are uploaded to SLIVER server 240 for post-processing. Correspondingly, FIG. 4B shows an exemplary screenshot of a VR replay of the post-processed spherical video in panorama-360 mode on a view client 270, according to one embodiment of the present invention. Here the full surrounding of a player's character 410 is presented in a panoramic image 450, with table 440 located at the right bottom corner of FIG. 4A appearing again at the far right of FIG. 4B.

Figure 5:
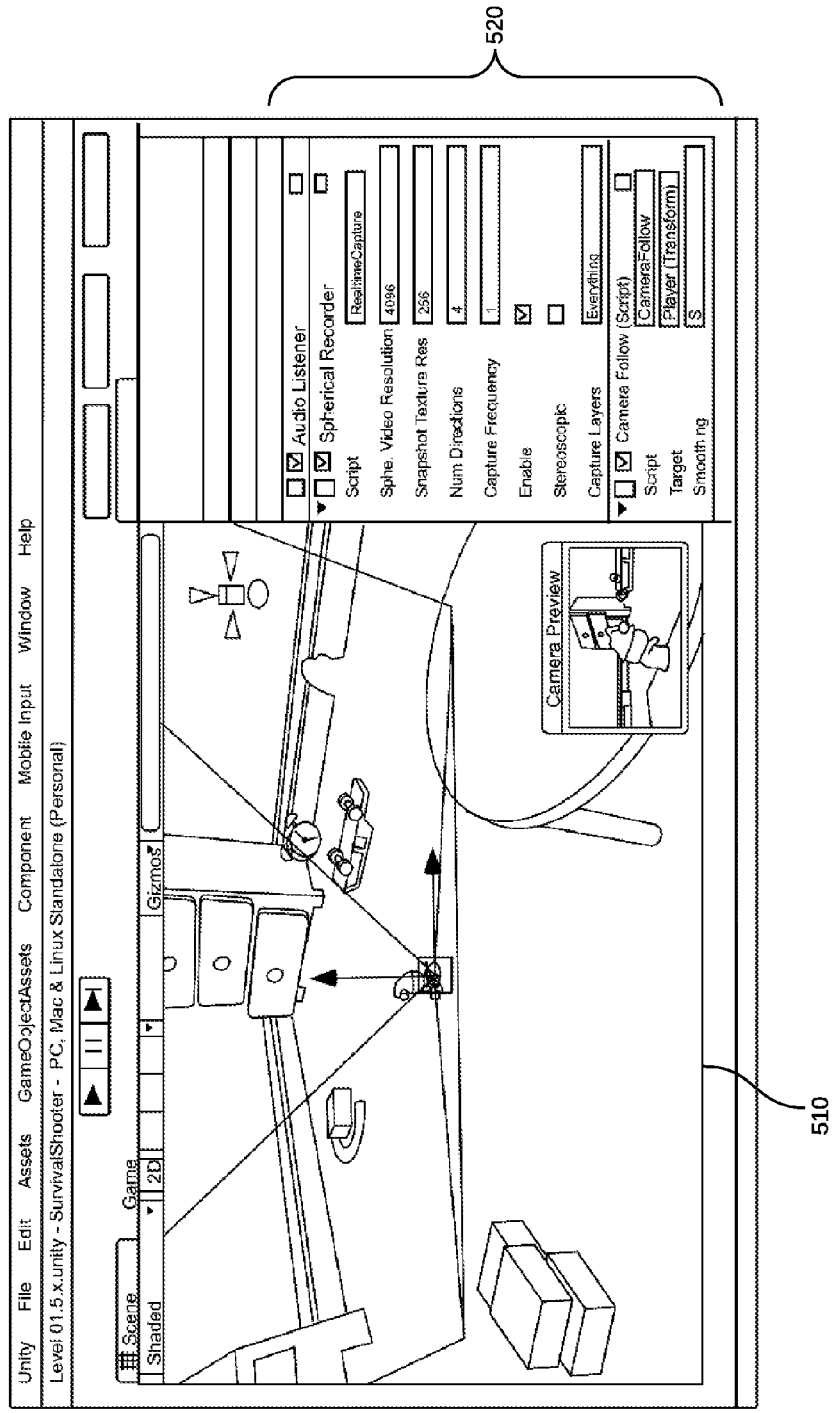
FIG. 5 is an exemplary screenshot of a preview interface for configuring a virtual camera array, according to one embodiment of the present invention.

FIG. 5 is another exemplary screenshot of a preview interface 500 provided by capture client 210 for configuring a virtual camera array according to one embodiment of the present invention. While window 510 shows the single frame infinite perspective view described with respect to FIG. 4A, configuration panel 520 allows a game developer, a player, or a general user to modify exemplary virtual camera array characteristics, such as targeted spherical video resolution, snapshot texture resolution, number of cameras and/or directions, capture frequency or frame rate, if both eyes are captured for stereoscopic output, capture layers, whether the camera tracks the player, and/or if a stable camera should be used or if camera stabilization should be performed. A game player may access preview interface 500 before a game play to enable real-time game capture, and correspondingly, to set how many virtual camera arrays are to be employed, how each virtual camera array may be arranged, and/or how each virtual camera may be configured.

Training Data Collection in Capture Client

Aside from 360-degree capture, another important responsibility for capture client 210 is to collect training data. As previously discussed, a dedicated machine learning system is employed to perform high resolution image recovery, view generation, and interpolation. Deep learning models within the machine learning system require proper training before being put to use. To collect training data, for each virtual camera, capture client 210 captures pairs of high-resolution and low-resolution screenshots for the same frame from the same frustum during game play or replay.

The frustum for training data capture needs not be very large, so training data may be collected occasionally without noticeable impact on the frame rate of the source game. Training data 214 is then uploaded to the server backend for later use and optimization. In addition, training data collection may be performed during normal game play, when a player is not recording. The resulting performance impact of training data collection is negligible, with little to no effect on the frame rate of the source game.

Detailed System Architecture

Figure 6:
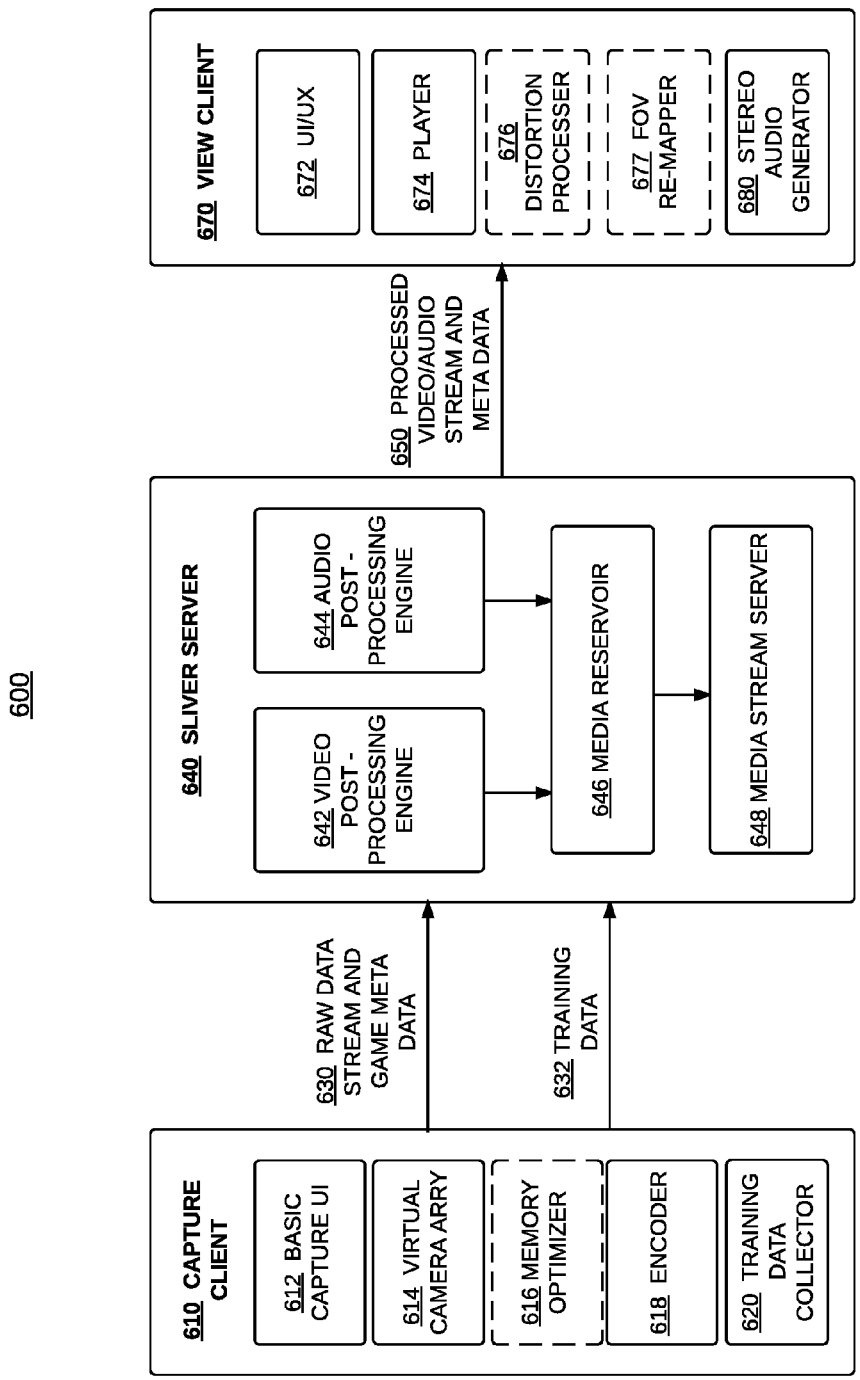
FIG. 6 is a schematic diagram showing the overall architecture of a game video recording and VR replay framework, according to one embodiment of the present invention.

As a more explicit illustration of the SLIVER platform, FIG. 6 is a schematic diagram showing the overall architecture 600 in more detail, according to one embodiment of the present invention. In this example, SLIVER capture client 610 includes a basic capture user interface (UI) 612 to allow a gamer or general user to enable or disable game video recordings, and to configure one or more virtual camera arrays 614 in terms of characteristics such as position, orientation, capture resolution, and/or frame rate. Recorded game videos are compressed and serialized through encoder 618, then transferred to SLIVER server 640 as raw data stream and game meta data 630. In addition, training data 632 obtained through training data collector 620 are periodically transferred to SLIVER server 640. In some embodiments, capture client 610 further comprises an optional memory optimizer 616 to perform texture or non-blocking pixel data read from the GPU to the main memory without stalling either the CPU or the GPU.

SLIVER server backend 640 includes a video post-processing engine 642, an audio post-processing engine 644, media reservoir 646, and media stream server 648. In some embodiments, SLIVER server 640 also includes components for general video hosting services such as on-demand replay, user management, and video ranking and searches. Within video post-processing engine, raw data uploaded from capture client 610 may be upscaled and/or interpolated before being warped into output spherical media such as screenshots, slideshows, and VR videos. Within the audio processing engine, raw input data are analyzed to identify, tag, and locate sound sources, thus enabling real-time spatial sound transformation by a VR view client 670 during virtual replay of the post-processed game recording, based on processed video/audio stream and meta data 650.

View client 670 allows a user of the SLIVER system to live-stream or replay monoscopic or stereoscopic spherical media received from SLIVER server 640 on demand. In this example, SLIVER view client 670 includes basic UI/UX designs 672 to allow a viewer to browse, watch, and share VR content. In some embodiments, view client 670 may be encapsulated with a game connector capture client to allow the upload and conversion of recorded data files exported by existing games or gaming platforms. UI/UX design 672 supports two modes of user interaction: the traditional mobile or desktop interaction mode, and full VR interaction mode; thus allowing the viewer to enjoy available VR content with or without a VR headset. View client 670 further includes a player 674, comprising a VR video player and optionally a 3D audio player. The VR video player may support both spherical monoscopic and stereoscopic media, in slidable panorama-360 mode, or full VR mode, depending on whether a VR headset is in use. In addition, as discussed with reference to FIGS. 3A to 3C, game meta data, such as player pitch and yaw, are available in some embodiments of the present invention, such that either SLIVER server 640 or view client 670 may annotate the player viewing direction with a semi-transparent marker on the spherical video. The 3D audio player, on the other hand, is responsible for playing 3D audio provided by stereo audio generator 680. Stereo audio generator 680 performs spatial sound transformation in real-time in response to the viewer's interactive inputs such as head and body movements during replay within a VR environment. In some embodiments, view client 670 further includes an optional distortion processor 676 and/or an optional field of view (FOV) re-mapper 677. Distortion processing steps, such as light consistency checks across both eyes and anti-aliasing filtering, are especially beneficial for enhancing the VR experience without creating bodily discomfort when the VR content is viewed through a VR headset.

Server Backend

Figure 7:
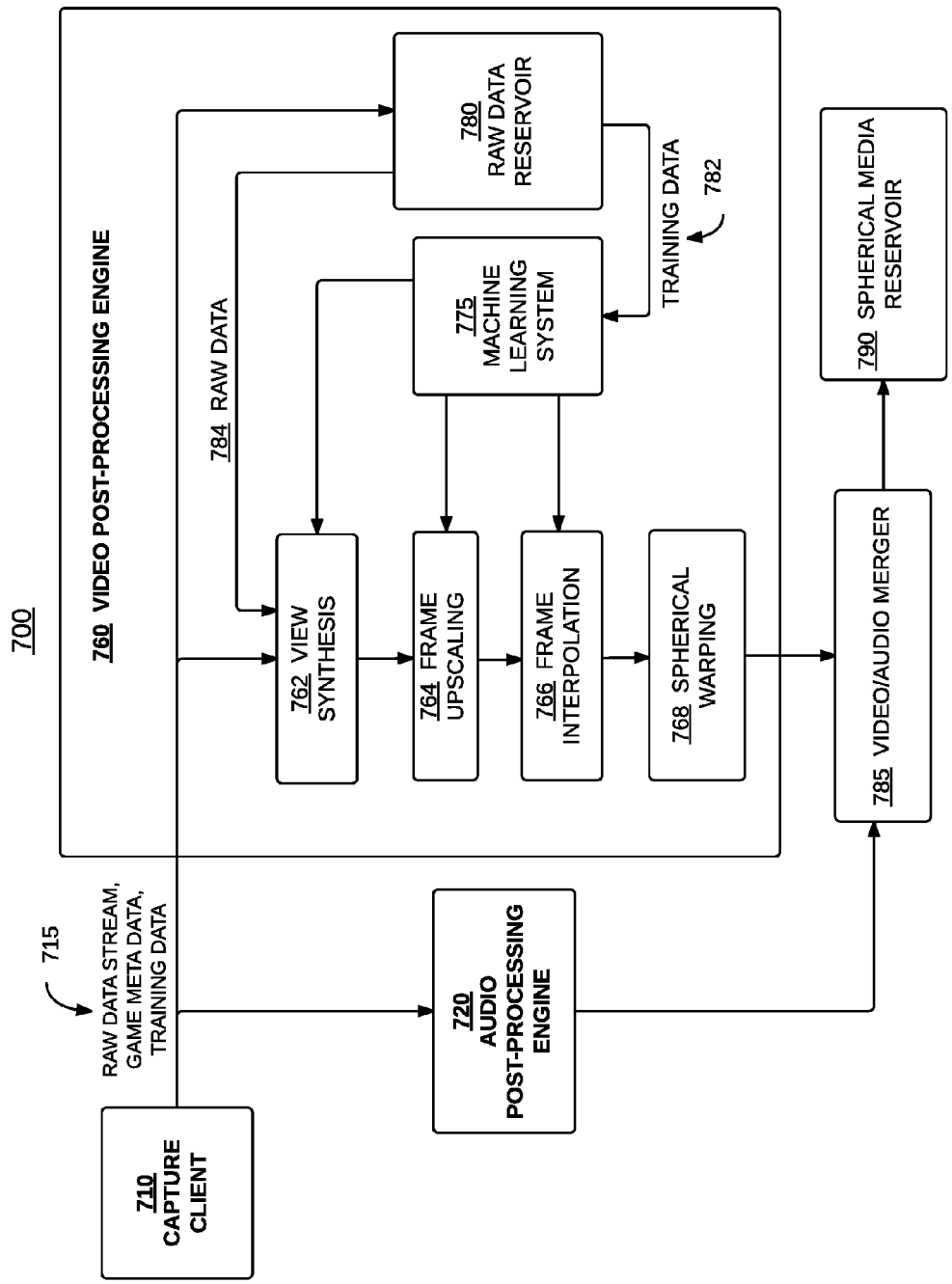
FIG. 7 is a schematic diagram for a video post-processing engine, according to one embodiment of the present invention.

FIG. 7 is a schematic diagram 700 for a video post-processing engine 760 within a SLIVER server backend, implemented according to one embodiment of the present invention. In general, the raw data stream uploaded from capture client 710 is captured with low resolution and low frame rate. Within video post-processing engine 760, raw data is first passed through a view synthesis process 762, which shall be described in more detail with respect to FIG. 8. View-synthesized raw data is passed through a frame upscaling process 764 for high resolution recovery, and a frame interpolation process 766, where both processes rely on machine learning system 775. In addition, raw input data stream, game meta data, and training data 715 may be selectively stored in raw data reservoir 780 for later use. Upscaled and frame interpolated intermediate videos are spherically warped through process 768, and the output spherical media are combined by video/audio merger 785 with 3D audio data from audio post-processing engine 720, before the final product spherical media are stored in spherical media reservoir 790.

In some embodiments of the present invention, one or more deep neural networks, or machine learning algorithms, may be employed within machine learning system 775 for high resolution recovery of the view synthesized raw data. Because of the highly repetitive nature of game images, a well-trained deep learning model such as a convolutional neural network may handle game image resolution recovery effectively. Two categories of repetitiveness may be taken into account. The first is internal similarity, where image patterns often repeat within the same frame, for game scenes are usually generated from a limited set of textures. The second is external similarity, where image patterns repeat across frames, even frames extracted from videos generated by different players, since game scenes played by different players are still highly similar. The inherent repetitiveness of image patterns from game play allows the deep neural network to effectively learn the mapping between low-resolution game images and their high resolution counterparts. Hence, the deep neural network within machine learning system 775 may be trained using training data 782, which comprises pairs of high and low resolution images collected by a capture client as described with respect to training data collection, to perform high resolution recovery of raw input data. Furthermore, such a deep neural network may be employed for frame interpolation, where extra frames are generated and inserted to a video stream to make it smoother. In various embodiments of the present invention, view synthesis 762, high resolution recovery 764, frame interpolation 766, image or camera stabilization, and spherical warping 768 may be carried out interchangeably in any desired order. Furthermore, any of view synthesis 762, high resolution recovery 764, frame interpolation 766, and image or camera stabilization may be optional.

Since the capture client constantly collects training data, ever increasing amounts of training data 782 may be gathered as players play games or as users convert external data files into low resolution game recordings. As a result, the deep neural network within machine learning system 775 may be gradually better trained to further improve the quality of existing videos iteratively. Thus, the quality of the post-processed videos is constantly improving. In some embodiments, the resolution of captured raw video may be reduced as the deep neural network improves, without sacrificing the quality of the final post-processed video. Over time, the overhead impact on the source game may continue to decrease and thereby not affect game performance at all. In addition, as more training data 782 become available, raw data 784 cached or stored in raw data reservoir 780 may be passed through the post-processing pipeline again to generate spherical videos with better quality than they were when upscaled or interpolated the first time. The resulting high-quality spherical media may replace corresponding spherical media previously generated and stored in reservoir 790. In some embodiments, SLIVER server 640 may be scheduled to perform such video quality re-optimization periodically, on an hourly or daily basis, or asynchronously, when the amount of available training data 782 reaches a pre-defined threshold value.

Once upscaled and interpolated, intermediate video frames are stitched together to generate spherical video image sequences through a spherical warping process 768. With virtual camera arrays, the viewing angle and frustum can be controlled with high precision during video capture. Thus, image stitching and spherical warping is relatively easy compared to stitching images obtained by real world cameras such as GoPro or GoogleJump. For example, a standard equirectangular projection may be used to turn a set of six-direction images taken by the virtual camera array shown in FIG. 3A into a spherical image. Recall that images captured by individual cameras within a virtual camera array may be formatted into a single video stream or multiple video streams in different embodiments of the present invention. For example, four sub-images synchronously or simultaneously taken by the virtual camera array shown in FIG. 3B may be appropriately ordered and combined into a single video frame, with individual video frames serialized chronologically to generate a single raw video data stream. In cases where each of the four cameras captures at different resolutions or frame rates, each combined video frame may contain sub-images synchronously taken by a selected set instead of all of the virtual cameras within the given array. Alternatively, image sequences captured by each of the four virtual cameras may correspond to a separate raw video data stream. In either case, meta data may be encoded together with raw video data to annotate the particular video format employed. Once the raw data stream and meta data 715 are passed into video post-processing engine 760, sub-images may be extracted first, or alternatively frame upscaling and frame interpolation may be performed on the video frames before sub-image extraction. In some embodiments of the present invention, intermediate file format optimization may be performed within video post-processing engine 760 to better utilize available computing resources.

Figure 8:
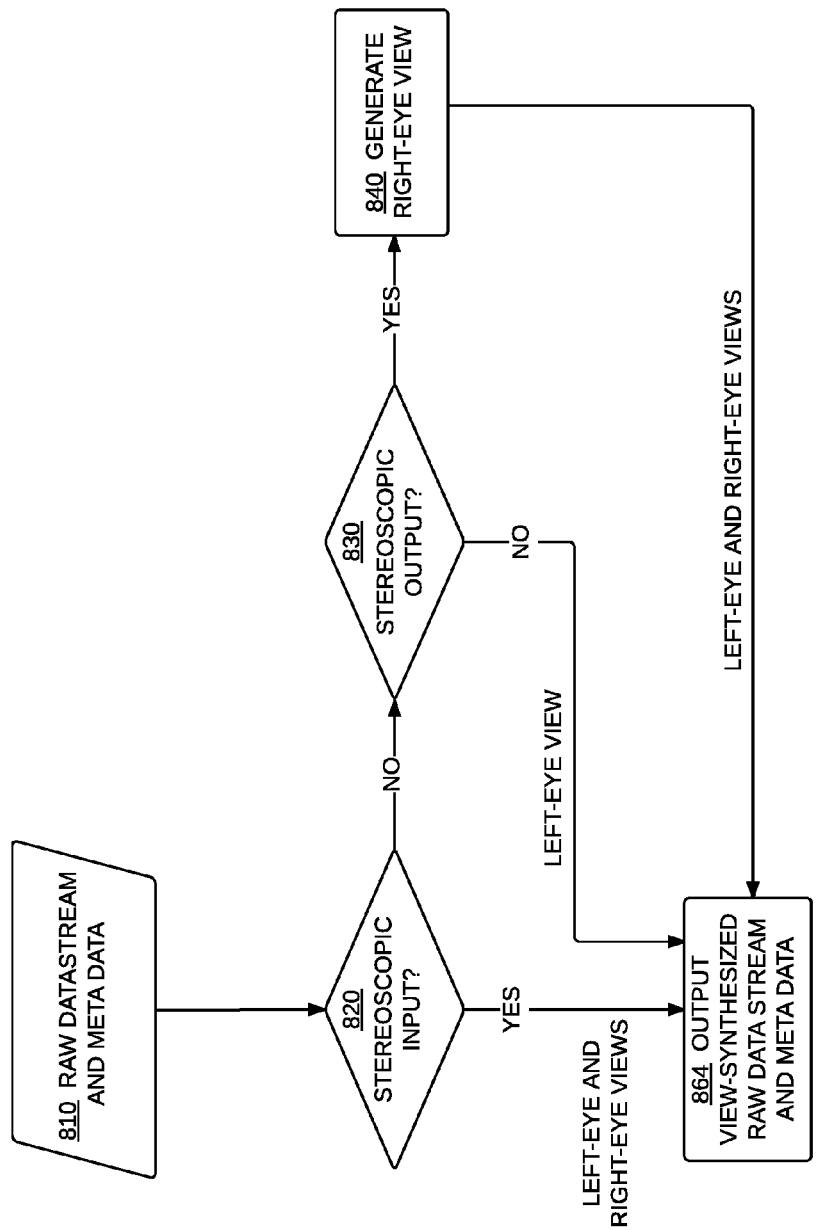
FIG. 8 is a flow diagram for view synthesis by a view synthesizer, according to one embodiment of the present invention.

FIG. 8 is a flow diagram 800 for view synthesis by a view synthesizer within a video post-processing engine, according to one embodiment of the present invention. Observe that the above-mentioned post-processing pipeline turns the input raw data into monoscopic spherical media. To generate stereoscopic spherical media, there are two approaches. The first is to record the game video for both eyes with two virtual camera arrays in the capture client. This approach essentially doubles the workload of the capture client, and could consequently degrade the frame rate of the source game. Another approach is to use deep neural networks within machine learning system 775 to generate a right-eye view from a left-eye view, or vice versa. With virtual cameras, additional information may be readily available to assist view generation. Exemplary information include the distance of each pixel from the camera, camera location/movement at each frame, and/or the location and movement of the vertices of each object in the scene. Server-side view synthesis or generation removes the extra workload of stereoscopic spherical video generation from the capture client, and may be considered a preferred embodiment.

More specifically, as raw data stream and game meta data 810 is passed into the video post-processing engine, the raw data stream is checked at step 820 to determine whether it is stereoscopic. If the result is affirmative, both left-eye and right-eye views are outputted at step 864; otherwise, requirement on the output format is checked at step 830 to determine whether stereoscopic output is desired. If the answer is negative, only monoscopic left-eye view is output at step 864; otherwise, a right-eye view is generated based on the left-eye input at step 840, and both views are output at step 864. In this example, stereoscopic output is always copied directly from stereoscopic input. Correspondingly, a view client 670 may be responsible for displaying a post-processed stereoscopic video stored in reservoir 790 in monoscopic format on devices that do not support stereoscopic playback.

Figure 9:
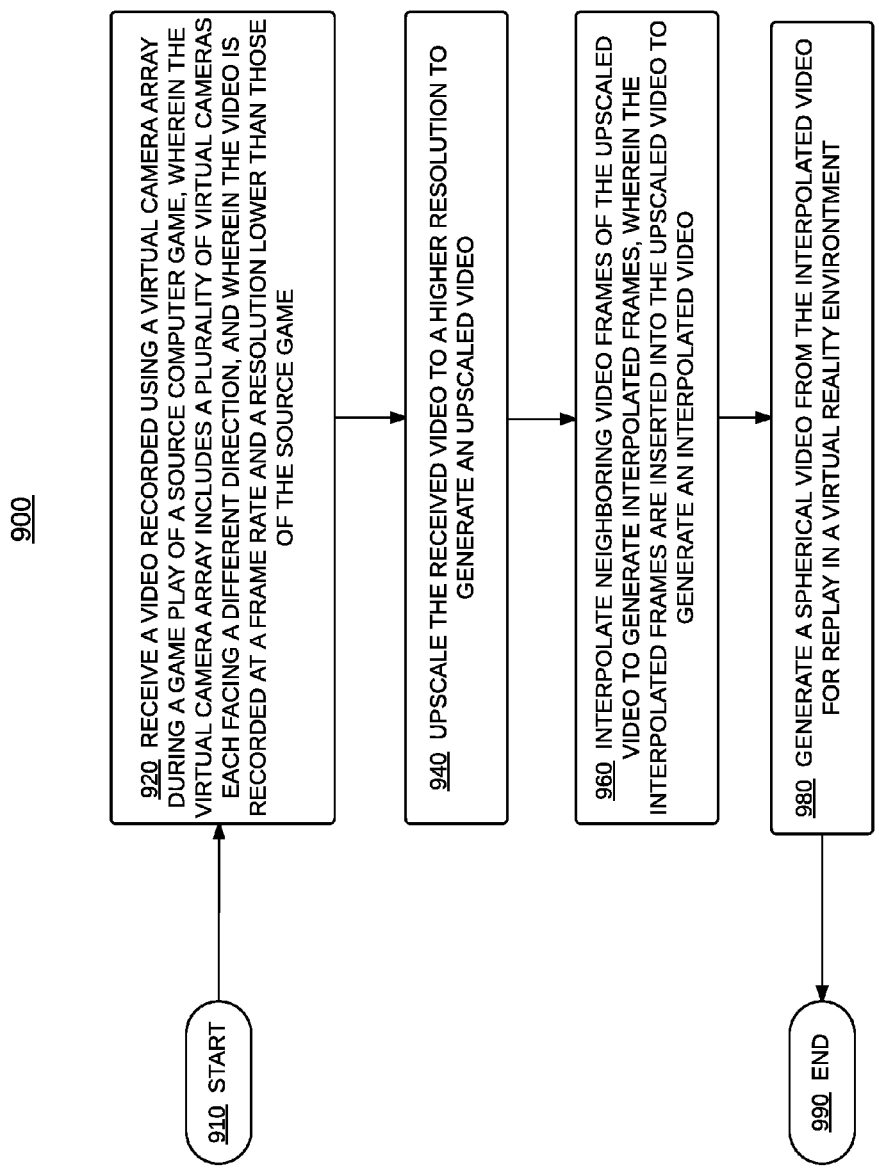
FIG. 9 is a flow diagram showing a method for generating a spherical video for replay in a virtual reality environment, according to one embodiment of the present invention.

FIG. 9 is a flow diagram showing a method for generating a spherical video, according to one embodiment of the present invention. Upon initialization of the process at step 910, a video recorded using a virtual camera array during a game play of a source computer game is received by a SLIVER server at step 920. In some embodiments, each frame of the received video contains multiple sub-images, each captured by individual cameras within a virtual camera array. For example, each frame may contain six sub-images for a virtual camera array in a cubic arrangement 300 as illustrated by FIG. 3A, or less than six sub-images if some of the virtual cameras are configured to capture at frame rates lower than that of the others. In addition, such a video frame may be formatted as a collection of individual sub-images, or it may be a collage of sub-images intelligently placed and bound. The latter format may be suitable in cases where particular video codecs are utilized by a capture client to compress raw video data for upload to the SLIVER server.

Generally, the raw video thus received at step 920 is recorded at both a frame rate and a resolution lower than those of the source game. The received video is upscaled to a higher resolution to generate an upscaled video at step 940, and neighboring video frames of the upscaled video are interpolated at step 960 to generate interpolated frames, where the interpolated frames are inserted into the upscaled video to generate an interpolated video. Sub-image extraction from raw or intermediate video frames may be performed before step 940, between steps 940 and 960, or after step 960. At step 980, interpolated and extracted sub-images are merged to generate a spherical video output, for replay in a virtual reality environment. The overall process terminates at step 990. In this embodiment, there is a one-to-one correspondence between the input video stream and the output video stream, assuming monoscopic and stereoscopic input and output conditions are implicitly met.

In some embodiments of the invention, steps 940, 960, and 980 may be shuffled in any order, as long as sub-image extraction is performed before the spherical video generation step 980. In other words, depending on the computing resource overheads associated with each processing step, image stitching may be performed before, between, or after frame interpolation or frame upscaling, and vice versa. The same applies to view synthesis and camera stabilization.

In yet some other embodiments, a separate video stream is received by a SLIVER server, corresponding to each virtual camera within a virtual camera array. An iterative process may then be employed to upscale and/or interpolate each video stream individually, before merging corresponding frames of individual video streams to generate a single output spherical video.

Figure 10:
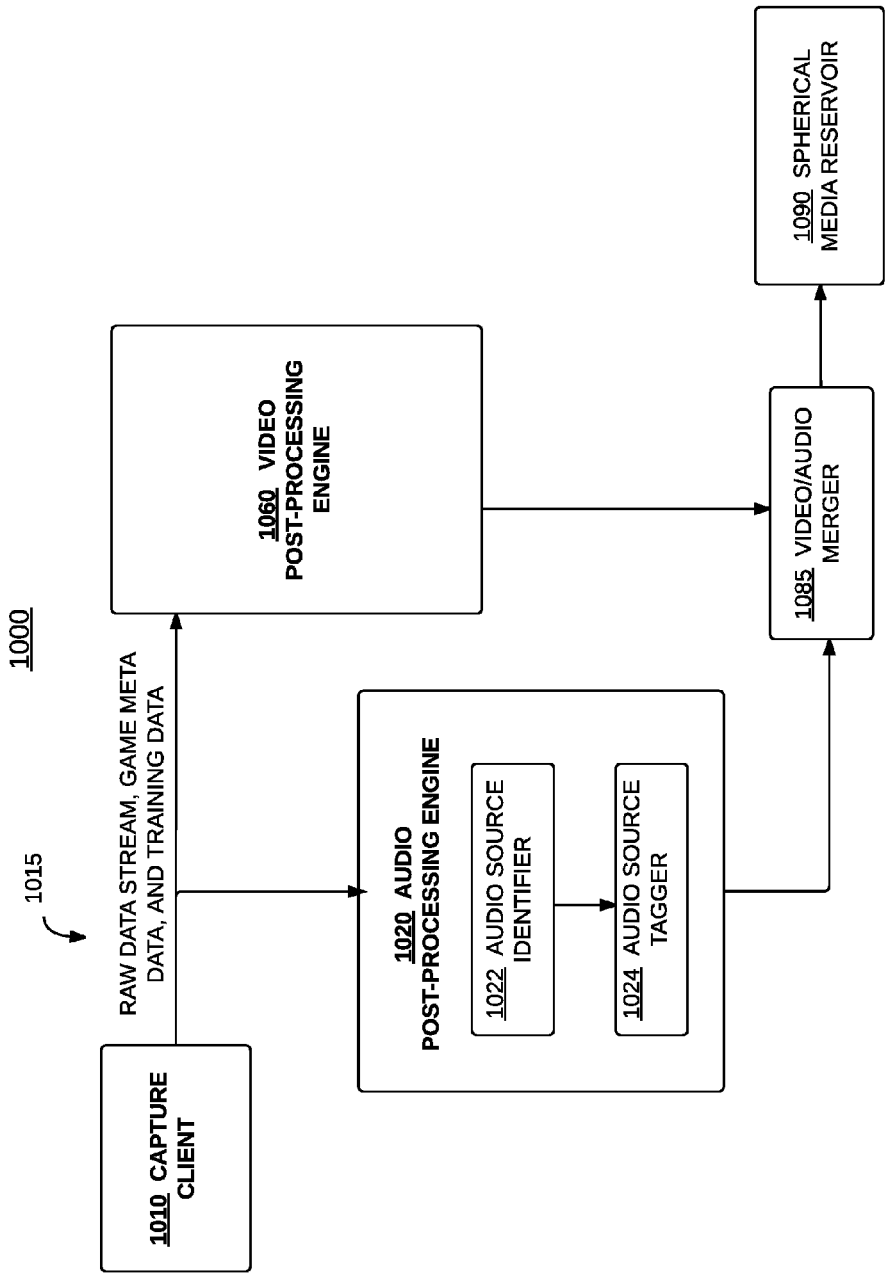
FIG. 10 is a schematic diagram for an audio post-processing engine, according to one embodiment of the present invention.

FIG. 10 is a schematic diagram 1000 for an audio post-processing engine 1020 within a SLIVER server backend, according to one embodiment of the present invention. 3D audio is different from traditional stereo audio and is a very important element of a fully immersive VR experience. When the viewer turns his or her head while wearing a VR headset, the locations of the sound sources should remain unchanged. Server-side audio post-processing engine 1020 analyzes the input audio stream of raw data stream 1015, to identify, tag, and locate the sound sources. The resulting information could be sent to a view client to generate proper 3D audio when a viewer rotates his head while in full VR mode. More specifically, raw data stream, game meta data, and training data 1015 uploaded to a SLIVER server from capture client 1010 is passed to audio post-processing engine 1020 in parallel to data transfer to video post-processing engine 1060. Audio source identifier 1022 and audio source tagger 1024 analyzes the input audio stream to identify and tag sound sources within the game play, without affecting any additional audio annotations by the original player. The resulting audio meta data are merged with post-processed video data by video/audio merger 1085, and the final product for VR replay is stored in spherical media reservoir 1090.

View Client

Figure 11:
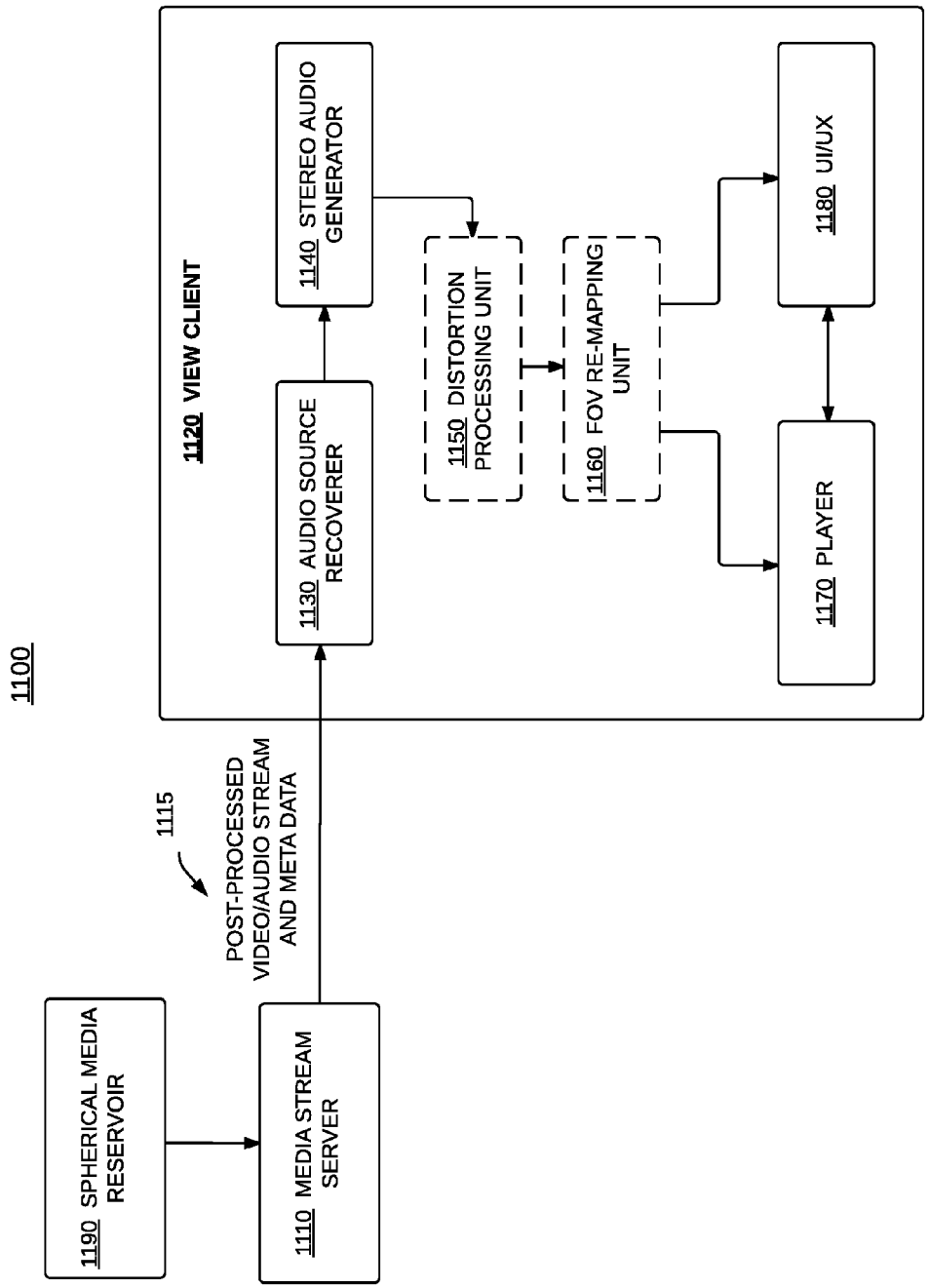
FIG. 11 is a schematic diagram for a view client, according to one embodiment of the present invention.

FIG. 11 is a schematic diagram 1100 for a view client 1120, according to one embodiment of the present invention. View client 1120 allows a user of the SLIVER system to live-stream or replay monoscopic or stereoscopic spherical media received from a SLIVER server on demand. Post-processed video/audio stream data and meta data 1115 stored in spherical media reservoir 1190 are provided by media stream server 1110 to view client 1120. Audio source recoverer 1130 and stereo-audio generator 1140 subsequently rely on audio meta data to perform spatial sound transformation in real-time in response to a viewer's head and body movements during game replay in full VR mode. In some embodiments, an optional distortion processing unit 1150 and an optional FOV re-mapping unit 1160 are included. Distortion processing steps such as light consistency checks across both eyes and anti-aliasing filtering are especially beneficial for enhancing the VR experience without creating bodily discomfort when the VR content is viewed through a VR headset.

As previously discussed with respect to FIG. 6, view client 1120 includes basic UI/UX designs 1180 to allow a viewer to browse, watch, and share VR content. The viewer may also interactively control the VR replay of a post-processed game recording through UI/UX 1180 to pause, slow-motion, pivot, or otherwise control viewing directions and angles to fully experience the recorded virtual game world. Moreover, in some embodiments, view client 1120 is jointly implemented with a game connector capture client to allow the upload and conversion of recorded data files exported by existing games or gaming platforms. View client 1120 further includes a player 1170, comprising a VR video player and a 3D stereo audio player. In some embodiments, player 1170 may utilize game meta data, such as player pitch and yaw, to annotate player viewing directions and/or head movements with a semi-transparent marker on a spherical video during game playback. The 3D audio player, on the other hand, is responsible for playing 3D audio provided by stereo audio generator 1140.

SLIVER Platform

Figure 12:
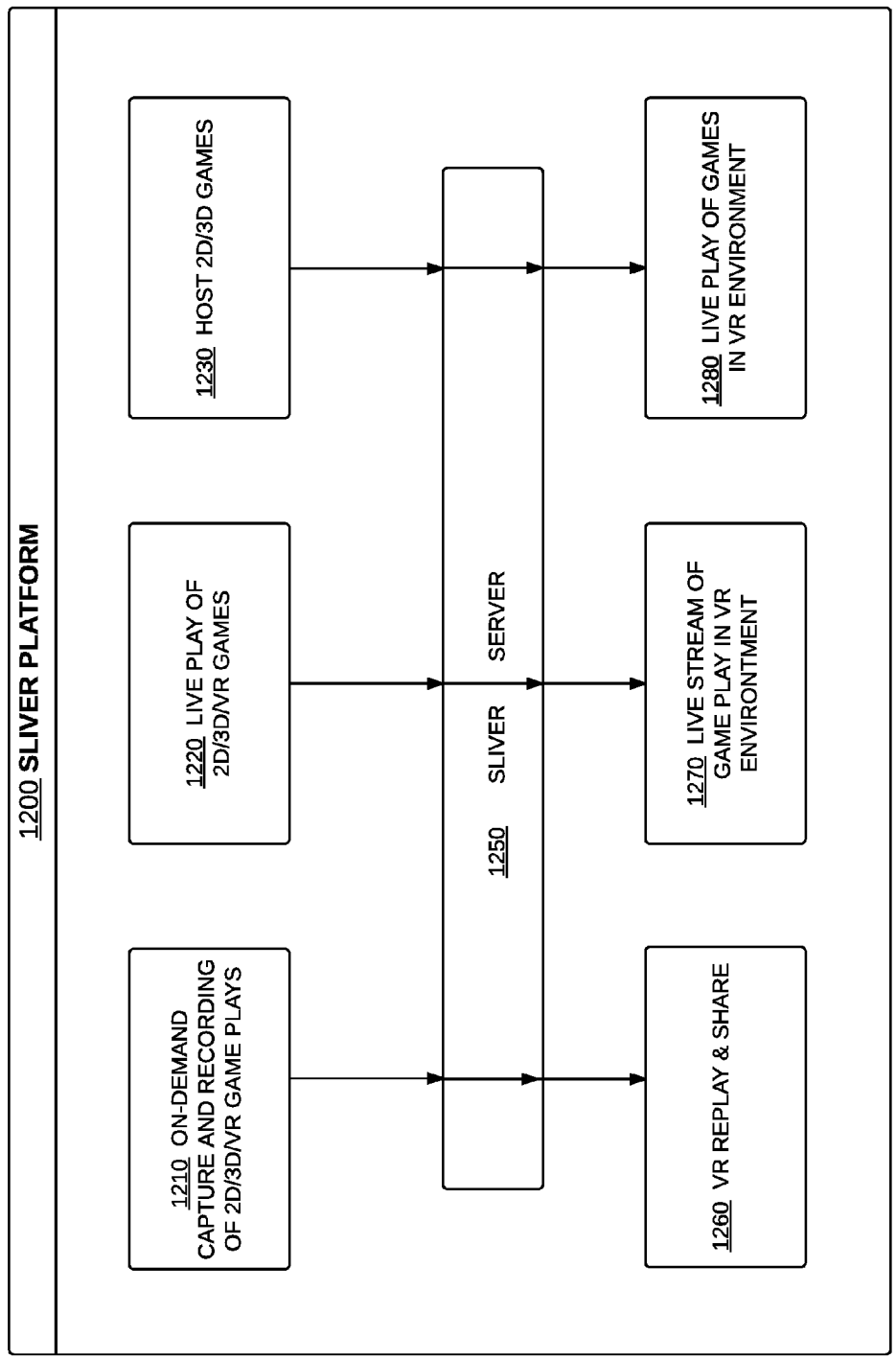
FIG. 12 is a schematic diagram illustrating a SLIVER platform, according to one embodiment of the present invention.

FIG. 12 is a schematic diagram illustrating functionalities provided by an extended SLIVER platform 1200, according to one embodiment of the present invention. Discussions within the present application have referred explicitly to providing on-demand capture and recording functions 1210 of 2D, 3D, and VR games, for post-processing within SLIVER server 1250, and VR replay and content sharing 1260 within SLIVER platform 1200. In some embodiments, SLIVER platform 1200 may additionally allow live streaming 1270 of a 2D, 3D, or VR game in an VR environment, where live game plays 1220 are post-processed, possibly in real-time by SLIVER server 1250. In some other embodiments, SLIVER platform 1200 may host existing 2D and 3D games to enable live game play in VR mode, as illustrated by processing functions 1230 and 1280.

Figure 13:
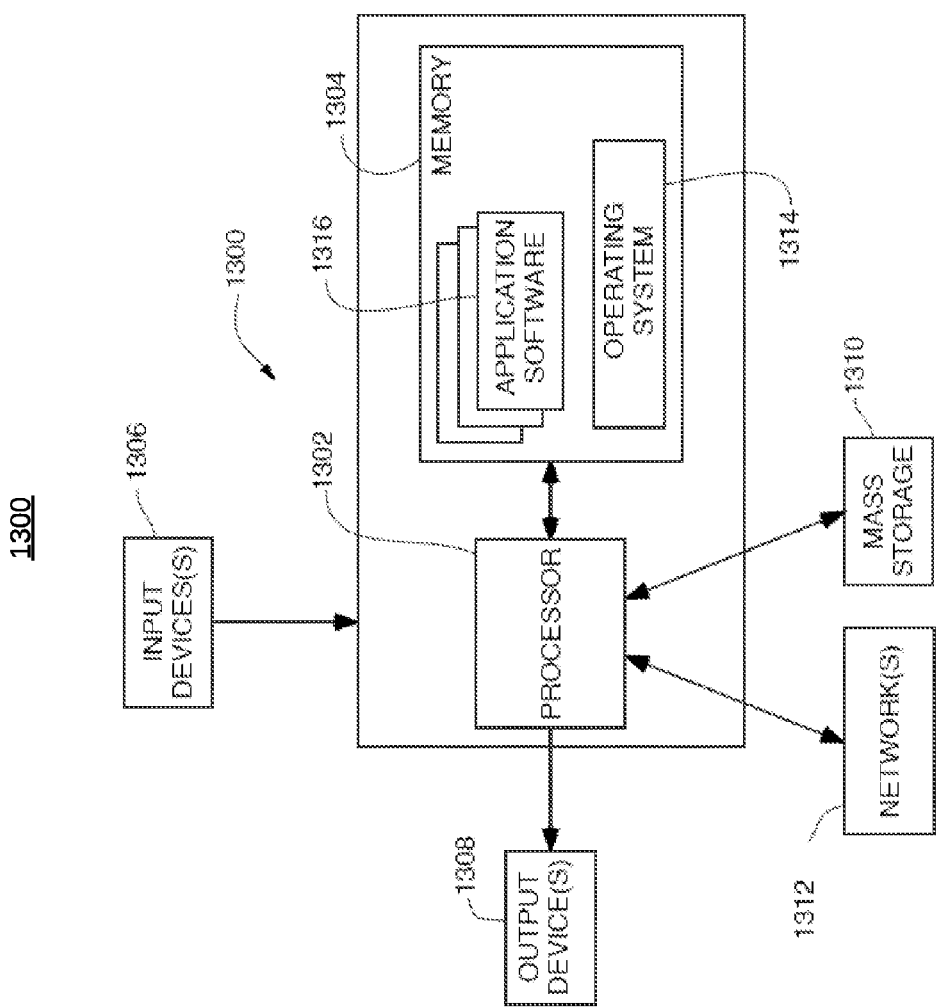
FIG. 13 is a schematic diagram of a computing device in which the present invention may be utilized, according to some embodiments of the present invention.

Finally, FIG. 13 is a schematic diagram of a computing device in which the present invention may be utilized, according to some embodiments of the present invention. A computing device comprises a hardware processor 1302 for executing program code, an operating system 1314, an application software 1316, which may implement the various embodiments of the present invention described herein, a physical memory 1304, at least one input device 1306, at least one output device 1308, a mass storage device 1310, and a network 1312. The network 1312 comprises a wired or wireless network to communicate to remote servers and databases via the Internet. The program code utilized by the computing device may be provided on a non-transitory physical storage medium, such as a local hard-disk, a hard-disk in the cloud, or any other physical storage medium (not shown).

CONCLUSIONS

One of ordinary skill in the art knows that the use cases, structures, schematics, and flow diagrams may be performed in other orders or combinations, but the inventive concept of the present invention remains without departing from the broader spirit of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, network interfaces etc., have not been shown, so as not to obscure the present invention. However, one of ordinary skill in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a web camera, etc.) and a display (e.g., a Liquid Crystal Display (LCD) panel). For additional storage, the hardware my also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system for processing computer game videos for virtual reality replay, comprising:
   a server having access to at least one processor; and
   a non-transitory physical medium for storing program code and accessible by the server, the program code that when executed by the processor causes the processor to:
      receive a video recorded using a virtual camera array during a game play of a source computer game, wherein the virtual camera array includes a plurality of virtual cameras each facing a different direction, wherein the video was recorded at a spatial resolution lower than that of the source computer game, wherein the virtual camera array was inserted into the source computer game using a capture client provided by a Software Development Kit (SDK) or a game connector module, and wherein the source computer game is an existing computer game that lacks spherical video output;
      upscale the received video to a higher spatial resolution to generate an upscaled video; and
      generate a spherical video from the upscaled video for later replay of the existing computer game that originally lacked spherical video output.

2. The system of claim 1, wherein the spherical video is a monoscopic spherical video.

3. The system of claim 1, wherein the source computer game is selected from the group consisting of 2D games, 3D games, and virtual reality games.

4. The system of claim 1, wherein the video is received from the game connector module, and wherein the game connector module converts an input data file into the video received.

5. The system of claim 1, wherein the program code further causes the processor to, for each of the plurality of virtual cameras, receive a pair of high-resolution and low-resolution screenshots of a scene during the game play, wherein the upscaling of the received video is based on a comparison of the high-resolution and low-resolution screenshots.

6. The system of claim 1, wherein the virtual camera array includes three pairs of virtual cameras in a cubic arrangement, wherein each pair faces complementary directions, and wherein each pair faces directions orthogonal from the other two pairs.

7. The system of claim 1, wherein the program code further causes the processor to stabilize the upscaled video to generate a stabilized video, wherein the spherical video is generated from the stabilized video.

8. The system of claim 1, wherein the program code further causes the processor to interpolate neighboring video frames of the upscaled video to generate interpolated frames, wherein the interpolated frames are inserted into the upscaled video to generate an interpolated video, and wherein the spherical video is generated from the interpolated video by equirectangular projection.

9. The system of claim 1, wherein the program code further causes the processor to receive player meta data, comprising player pitch and yaw, during the game play, and wherein the spherical video is annotated with a player viewing direction based on the received player meta data.

10. The system of claim 1, wherein the program code further causes the processer to generate a second spherical video based on the upscaled video, and wherein the second spherical video is used to provide a stereoscopic view.

11. A non-transitory computer-readable storage medium for processing computer game videos for virtual reality replay, the storage medium comprising program code stored thereon, that when executed by a processor causes the processor to:

receive a video recorded using a first virtual camera array during a game play of a source computer game, wherein the first virtual camera array includes a plurality of virtual cameras each facing a different direction, wherein the video was recorded at a frame rate lower than that of the source computer game, and wherein the video was recorded at a resolution lower than that of the source computer game;

upscale the received video to a higher resolution to generate an upscaled video;

receive player meta data, comprising player pitch and yaw, during the game play; and generate a spherical video from the upscaled video for later replay, wherein the generated spherical video is annotated with a player viewing direction based on the received player meta data.

12. The non-transitory computer-readable storage medium of claim 11, wherein the spherical video is a monoscopic spherical video.

13. The non-transitory computer-readable storage medium of claim 11, wherein the source computer game is selected from the group consisting of 2D games, 3D games, and virtual reality games.

14. The non-transitory computer-readable storage medium of claim 11, wherein the program code further causes the processor to, for each of the plurality of virtual cameras, receive a pair of high-resolution and low-resolution screenshots of a scene during the game play, and wherein the upscaling of the received video is based on a comparison of the high-resolution and low-resolution screenshots.

15. The non-transitory computer-readable storage medium of claim 11, wherein the program code further causes the processor to stabilize the upscaled video to generate a stabilized video, and wherein the spherical video is generated from the stabilized video.

16. The non-transitory computer-readable storage medium of claim 11, wherein the program code further causes the processer to generate a second spherical video based on the upscaled video, and wherein the second spherical video is used to provide a stereoscopic view.

17. A non-transitory computer-readable storage medium for recording computer game videos for virtual reality replay, the storage medium comprising program code stored thereon, that when executed by a processor causes the processor to:

receive a request to record a game play of a source computer game for virtual reality replay, wherein the source computer game is an existing computer game that lacks spherical video output; and in response to receiving the request to record the game play for virtual reality replay;

record a video using a virtual camera array in real-time during the game play, wherein the virtual camera array includes a plurality of virtual cameras each facing a different direction, wherein the video is recorded at a frame rate lower than that of the source computer game, wherein the video is recorded at a spatial resolution lower than that of the source computer game, wherein the video from the virtual camera array is later stitched into a spherical video, wherein the spherical video comprises a replay of the source computer game that originally lacked spherical output, and wherein the virtual camera array was inserted into the source computer game using a capture client provided by a Software Development Kit (SDK) or a game connector module.

18. The non-transitory computer-readable storage medium of claim 17, wherein the video is monoscopic.

19. The non-transitory computer-readable storage medium of claim 17, wherein the source computer game is selected from the group consisting of 2D games, 3D games, and virtual reality games.

20. The non-transitory computer-readable storage medium of claim 17, wherein the program code further causes the processor to, for each of the plurality of virtual cameras, record a pair of high-resolution and low-resolution screenshots of a scene during the game play.

21. The non-transitory computer-readable storage medium of claim 17, wherein the virtual camera array is stable.

22. The non-transitory computer-readable storage medium of claim 17, wherein the program code further causes the processor to receive player meta data, comprising player pitch and yaw, during the game play, and wherein the spherical video is annotated with a player viewing direction based on the received player meta data.

23. The non-transitory computer-readable storage medium of claim 17, wherein the program code further causes the processer to record a second video using a second virtual camera array in real-time during the game play, wherein the second virtual camera array includes a second plurality of virtual cameras each facing a different direction, wherein the second video is recorded at a frame rate lower than that of the source computer game, wherein the second video is recorded at a spatial resolution lower than that of the source computer game, and wherein the second video is used to provide a stereoscopic view.

24. A non-transitory computer-readable storage medium for recording computer game videos for virtual reality replay, the storage medium comprising program code stored thereon, that when executed by a processor causes the processor to:

receive a demo file generated by a source computer game, wherein the demo file comprises an input visual or non-visual game recording of the source computer game, and wherein the source computer game is an existing computer game that lacks spherical video output;

initiate a game play of the source computer game, wherein the game play is configured according to the demo file; and transform the input visual or non-visual game recording in the demo file into a plurality of video recordings using a virtual camera array, wherein the plurality of video recordings are later stitched into a spherical video, wherein the spherical video comprises a replay of the source computer game that originally lacked spherical output, and wherein the virtual camera array was inserted into the source computer game using a capture client provided by a Software Development Kit (SDK) or a game connector module.

25. The non-transitory computer-readable storage medium of claim 24, wherein the video recordings are monoscopic.

26. The non-transitory computer-readable storage medium of claim 24, wherein the program code further causes the processor to, for each of the plurality of virtual cameras, record a pair of high-resolution and low-resolution screenshots of a scene during the game play.

27. The non-transitory computer-readable storage medium of claim 24, wherein the virtual camera array is stable.

28. The non-transitory computer-readable storage medium of claim 24, wherein the program code further causes the processor to receive player meta data, comprising player pitch and yaw, during the game play, and wherein the spherical video is annotated with a player viewing direction based on the received player meta data.

29. The non-transitory computer-readable storage medium of claim 24, wherein the program code further causes the processer to transform a second input visual or non-visual game recording in the demo file into a second plurality of video recordings using a second virtual camera array, wherein the second virtual camera array includes a second plurality of virtual cameras each facing a different direction, and wherein the second video is used to provide a stereoscopic view.

* * * * *